(12) United States Patent
Gogotsi et al.

(10) Patent No.: US 9,171,679 B2
(45) Date of Patent: Oct. 27, 2015

(54) ELECTROCHEMICAL FLOW CAPACITORS

(75) Inventors: Yury Gogotsi, Warminster, PA (US);
Volker Presser, Saarbrucken (DE);
Emin Caglan Kumbur, Philadelphia, PA (US)

(73) Assignee: Drexel University, Philadelphia, PA (US)

( * ) Notice: Subject to any disclaimer, the term of this patent is extended or adjusted under 35 U.S.C. 154(b) by 265 days.

(21) Appl. No.: 13/985,434

(22) PCT Filed: Feb. 14, 2012

(86) PCT No.: PCT/US2012/024960
§ 371 (c)(1),
(2), (4) Date: Oct. 21, 2013

(87) PCT Pub. No.: WO2012/112481
PCT Pub. Date: Aug. 23, 2012

(65) Prior Publication Data
US 2014/0042989 A1 Feb. 13, 2014

Related U.S. Application Data

(60) Provisional application No. 61/443,488, filed on Feb. 16, 2011, provisional application No. 61/555,648, filed on Nov. 4, 2011.

(51) Int. Cl.
*H01G 9/00* (2006.01)
*H01G 11/54* (2013.01)
*H01G 11/32* (2013.01)
(Continued)

(52) U.S. Cl.
CPC ............... *H01G 11/54* (2013.01); *H01G 11/32* (2013.01); *H01G 11/52* (2013.01); *H01G 11/60* (2013.01); *H01G 11/62* (2013.01); *H02J 7/00* (2013.01); *Y02B 10/30* (2013.01); *Y02E 60/13* (2013.01); *Y02T 10/7022* (2013.01)

(58) Field of Classification Search
USPC ......... 361/502, 503–504, 509, 512, 516–519, 361/523, 525, 528–529
See application file for complete search history.

(56) References Cited

U.S. PATENT DOCUMENTS 4,150,200 A 4/1979 Sullivan
4,438,591 A 3/1984 Kessler
(Continued)

FOREIGN PATENT DOCUMENTS

WO WO 2008/069833 A2 6/2008
WO WO 2009/123784 A2 10/2009

OTHER PUBLICATIONS

Basavalingu, B. et al., "Decomposition of silicon carbide in the presence of organic compounds under hydrothermal conditions", Carbon, 39, 2001, 1763-1767.
(Continued)

*Primary Examiner* — Nguyen T Ha
(74) *Attorney, Agent, or Firm* — Baker & Hostetler LLP

(57) ABSTRACT

The present invention generally relates to devices for energy storage technologies, and more particularly to electrochemical flow capacitor systems and applications. In some aspects, these flow capacitors have at least one electrode comprising a non-stationary solid or semi-solid composition comprising supercapacitive particles and an electrolytic solvent in electrical communication with at least one current collector, and energy is stored and/or released by charging and/or discharging the electrode(s).

37 Claims, 25 Drawing Sheets

(51) Int. Cl.
*H01G 11/52* (2013.01)
*H01G 11/60* (2013.01)
*H01G 11/62* (2013.01)
*H02J 7/00* (2006.01)

(56) References Cited

U.S. PATENT DOCUMENTS

| | | | |
|---|---|---|---|
| 5,402,306 A | 3/1995 | Mayer et al. | |
| 6,426,862 B1 * | 7/2002 | Vasechkin et al. | 361/502 |
| 6,614,646 B2 * | 9/2003 | Bogaki et al. | 361/502 |
| 6,882,517 B2 | 4/2005 | Tano et al. | |
| 7,173,806 B2 | 2/2007 | Hinoki et al. | |
| 7,256,099 B2 | 8/2007 | Takahashi et al. | |
| 7,303,975 B2 | 12/2007 | Hinoki et al. | |
| 7,468,222 B2 | 12/2008 | Takahashi et al. | |
| 7,583,494 B2 * | 9/2009 | Maeshima | 361/502 |
| 7,638,216 B2 | 12/2009 | Yang et al. | |
| 7,708,787 B2 | 5/2010 | Hinoki et al. | |
| 7,754,382 B2 | 7/2010 | Kurihara et al. | |
| 7,771,495 B2 | 8/2010 | Kobayashi et al. | |
| 7,820,321 B2 | 10/2010 | Horne et al. | |
| 7,903,390 B2 * | 3/2011 | Fan | 361/502 |
| 8,218,288 B2 * | 7/2012 | Horikoshi | 361/502 |
| 2003/0064565 A1 | 4/2003 | Maletin et al. | |
| 2003/0169557 A1 | 9/2003 | Noguchi et al. | |
| 2004/0002002 A1 | 1/2004 | Mizuta et al. | |
| 2004/0121204 A1 | 6/2004 | Adelman et al. | |
| 2004/0207539 A1 | 10/2004 | Schultz et al. | |
| 2009/0027828 A1 | 1/2009 | Jung et al. | |
| 2010/0008021 A1 | 1/2010 | Hu et al. | |
| 2010/0014216 A1 | 1/2010 | Cadek et al. | |
| 2010/0033903 A1 | 2/2010 | Kim et al. | |
| 2010/0047671 A1 | 2/2010 | Chiang et al. | |
| 2010/0119815 A1 | 5/2010 | Kim | |
| 2010/0151318 A1 | 6/2010 | Lopatin et al. | |
| 2010/0203391 A1 | 8/2010 | Lopatin et al. | |
| 2010/0219067 A1 | 9/2010 | Koval et al. | |
| 2013/0244121 A1 | 9/2013 | Gogotsi et al. | |

OTHER PUBLICATIONS

Bleicher, A., "Nano-Onions Give Supercapacitors Extra Oomph", IEEE Spectrum, Aug. 2010, 2 pages.

Brogioli, D. et al., "A prototype cell for extracting energy form a water salinity difference by means of double layer expansion in nanoporous carbon electrode", Energy Environ. Sci. Jan. 2011, 4, 772-777.

Bushueva et al., "Double layer supercapacitor properties of onion-like carbon materials," Phys. Stat. Sol. (b), Oct. 2008, 245(10), 2296-2299.

Dash, R. et al., "Titanium carbide derived nanoporous carbon for energy-related applications", Carbon 44, Oct. 2006, 2489-2497.

Deshmukh, A. A. et al., "Carbon spheres", Material Science and Engineering R 70 Sep. 2010,1-28.

Guangda Li et al., "A Facile Approach for the Synthesis of Uniform Hollow Carbon Nanospheres", J Phys Chem C, Jan. 2008, 112, 1896-1900.

Huang et al., "Curvature effects in carbon nanomaterials: Exohedral versus endohedral supercapacitors," J. Mater. Res., Aug. 2010, 25(8), 1525-1531.

Lei, Z. et al., "Mesoporous carbon nanospheres with an excellent electrocapacitive performance", J. Mater. Chem., Dec. 2011, 21, 2274-2281.

Lu Wei et al., "Hydrothermal Carbonization of Abundant Renewable Natural Organic Chemicals for High-Performance Supercapacitor Electrodes", Adv. Energy Mater., May 2011, 1, 356-361.

Park et al., "Pseudocapacitive Behavior of Carbon Nanoparticles Modified by Phosphomolybdic Acid," Journal of the Electrochemical Society, Sep. 2009, 156(11), A921-A926.

Plonska-Brzezinska et al., "Electrochemical Properties of Small Carbon Nano-Onion Films," Electrochemical and Solid-State Letters, Jan. 2010, 13(4), K35-K38.

Portet et al., "Electrochemical characterizations of carbon nanomaterials by the cavity microelectrode technique," Electrochimica Acta, Nov. 2008, 53(26), 7675-7680.

Portet et al., "Electrochemical performance of carbon onions, nanodiamonds, carbon black and multiwalled nanotubes in electrical double layer capacitors," Carbon, Nov. 2007, 45(13), 2511-2518.

Rose, M. et al., "Hierarchical Micro- and Mesoporous Carbide-Derived Carbon as a High-Performance Electrode Material in Supercapacitors", small, Mar. 2011, 7(8), 1108-1117.

Pech et al, "Ultrahigh-Power Micrometre-Sized Supercapacitors Based on Onion-Like Carbon", Nature Nanotechnology, Sep. 2010, E-published Aug. 15, 2010, 5, 651-654.

* cited by examiner

ELECTROCHEMICAL FLOW CAPACITORS

GOVERNMENT INTERESTS

This invention was made with government support under Grant No. DE-AC05-00OR22725 awarded by the Department of Energy. The government has certain rights in the invention.

CROSS-REFERENCE TO RELATED APPLICATIONS

This application is the National Stage of International Application No. PCT/US2012/024960, filed Feb. 14, 2012, which claims the benefit of U.S. Provisional Application No. 61/443,488, filed Feb. 16, 2011, and U.S. Provisional Application No. 61/555,648, filed Nov. 4, 2011, the disclosures of which are incorporated herein by reference in their entireties.

TECHNICAL FIELD

The present invention generally relates to devices for energy storage technologies, and more particularly to electrochemical flow capacitor systems and applications.

BACKGROUND

Energy storage is one of the largest challenges of modern society. This applies to all amounts of stored energy, ranging from small devices (e.g., watches, cell phones or portable communication devices, and laptop computers) to large power-consuming entities, such as cities or factories. For large scale storage, a common method to harvest energy is to pump water into an elevated reservoir and use its released potential when flowing back to a deeper level. The main drawback of this technique is its relatively low storage energy capacity, which dates back to the first power plants built over a century ago.

Conventional batteries operate by converting chemical to electrical energy. In operation, the electronic current can be used to drive an external device. Unfortunately, such batteries are not easily scalable and suffer from degradation over time, with less and less energy being stored on continuous use.

Flow batteries emerged in the 1970s and offer scalable energy storage. These types of batteries are based on an electrolyte that is pumped through a system. Two separate flow routes meet at a point where electrons are transferred from one electrolyte to the other as a result of applied voltage (i.e., the electrical energy is transformed and stored as chemical energy). The two electrolytes (now charged positively and negatively, respectively) are stored in separate containers, or reservoirs. Having them flow back to a juncture point where electron transfer is possible, the chemically stored energy is harvested as electrical energy. While they can be built to almost any value of total charge capacity by increasing the size of the catholyte and anolyte reservoirs, one of their limitations is that their energy density, being in large part determined by the solubility of the metal ion redox couples in liquid solvents, is relatively low. Although an intriguing method of energy storage, such a system requires electrically conductive electrolytes which are often toxic or extremely acidic and corrosive.

Chiang, et al., U.S. Patent Application Publication 2010/0047671, which is incorporated by reference herein in its entirety, has recently disclosed an extension to the concept of flow batteries wherein slurries of electro-active materials distributed in ion-storing liquids which are themselves redox-active, are passed through so-called electro-active zones, providing one or two streams of chemically oxidized or reduced slurries. These separate slurries can be separated and stored until the need to recover the chemical energy, at which point the separate slurries are brought back together and the chemical energy is harvested, much like the process in the redox flow batteries. The stated advantage of this method is the ability to achieve much higher storage battery storage. The unstated disadvantage is that the method may suffer from many of the same problems of stationary batteries—i.e., discharging on storage, limited speed of electrical charge/discharge, and limited lifetime/cycle-ability. Other disadvantages include environmental hazards associated with redox reactive materials used in battery electrodes and electrolytes.

Thus, there remains a need for scalable high energy-density and high power-density energy storage devices.

SUMMARY

The present invention takes advantage of physical energy storage using a supercapacitor, where energy is stored by ion adsorption on charged surfaces, rather than by exchanging electrons in chemical or redox reactions. Advantages of various embodiments of the present invention include minimal degradation, easy scalability, use of relatively safe materials of construction (e.g., options including carbon-based flowable electrode materials and aqueous, organic, or ionic liquid electrolytes), while at the same time providing the adaptability to store small amounts of energy (e.g., for use in private homes or transportation devices) or even for storage of large quantities of energy as required for energy storage for wind turbines, solar farms, as well as more conventional power plants.

Embodiments of this invention provide energy storage devices comprising: (a) a positive electrode current collector, a negative electrode current collector, and an ion-permeable separator separating the positive and negative electrode current collectors; (b) a positive electrode disposed between the positive electrode current collector and the ion-permeable separator; (c) a negative electrode disposed between the negative electrode current collector and the ion-permeable separator; wherein at least one of the positive and negative electrodes comprises a non-stationary (including moveable or flowable, relative to the current collectors) solid or semi-solid composition comprising supercapacitive particles and an electrolytic solvent; and wherein the electrolytic solvent is substantially free of electrochemically oxidizable or reducible species. In some embodiments, the electrodes are in electrical communication with at least a portion of the respective electrode current collector.

The invention also teaches the use of these devices in storing and releasing energy.

Various embodiments provide methods of storing energy using an energy storage device, (a) said energy storage device comprising (i) a positive electrode current collector, a negative electrode current collector, and an ion-permeable separator separating the positive and negative electrode current collectors; (ii) a positive electrode disposed between the positive electrode current collector and the ion-permeable separator and in electrical communication with the positive electrode current collector; the positive electrode current collector and the ion-permeable separator defining a positive capacitive zone accommodating the positive electrode; (iii) a negative electrode disposed between the negative electrode current collector and the ion-permeable separator and in electrical communication with the negative electrode current collector; the negative electrode current collector and the ion-permeable separator defining negative capacitive zone accommodating the negative electrode; wherein at least one of the positive and negative electrodes comprises a non-stationary (including moveable or flowable) solid or semi-solid composition comprising supercapacitive particles and an electrolytic solvent; and wherein the electrolytic solvent is substantially free of electrochemically oxidizable or reducible species; said method comprising (b) transporting a portion of an uncharged non-stationary solid or semi-solid composition comprising supercapacitive particles and a solvent comprising an electrolyte into the capacitive zone. Additional embodiments further comprise (c) applying an electric field is applied across the positive and negative electrode current collectors; and (d) exposing said portion of uncharged non-stationary solid or semi-solid composition to said electric field for a time sufficient to charge the supercapacitive particles, thereby producing a portion of charged non-stationary solid or semi-solid composition.

Other embodiments provide methods of releasing stored energy using an energy storage device, (a) said energy storage device comprising (i) a positive electrode current collector, a negative electrode current collector, and an ion-permeable separator separating the positive and negative electrode current collectors; (ii) a positive electrode disposed between the positive electrode current collector and the ion-permeable separator and in electrical communication with the positive electrode current collector; the positive electrode current collector and the ion-permeable separator defining a positive capacitive zone accommodating the positive electrode; (iii) a negative electrode disposed between the negative electrode current collector and the ion-permeable separator and in electrical communication with the negative electrode current collector; the negative electrode current collector and the ion-permeable separator defining negative capacitive zone accommodating the negative electrode; wherein at least one of the positive and negative electrodes comprises a non-stationary solid or semi-solid composition comprising supercapacitive particles and an electrolytic solvent; and wherein the electrolytic solvent is substantially free of electrochemically oxidizable or reducible species; and said method comprising (b) transporting a portion of an charged non-stationary solid or semi-solid composition comprising charged supercapacitive particles, such that the charged supercapacitive particles come into electrical communication with the adjacent current collector; and (c) discharging the charged supercapacitive particles through the adjacent current collector.

In some embodiments of the device and the methods of operating an energy storage device and of storing or releasing energy, both the positive and negative electrodes comprise a non-stationary (including moveable or flowable, with respect to the relevant current collector) solid or semi-solid composition comprising supercapacitive particles and an electrolytic solvent; and wherein the electrolytic solvent is substantially free of electrochemically oxidizable or reducible species. Similarly, certain embodiments provide devices or methods wherein one of the two electrodes comprises supercapacitive particles and an electrolytic solvent which contains electrochemically oxidizable or reducible species, for example in a pseudocapacitive system, provided the other electrode is substantially free of such oxidizable or reducible species. In still further separate embodiments, one or both of the two electrodes contains electrochemically oxidizable or reducible species known as pseudocapacitive materials. Said pseudocapacitive materials may be organic or inorganic, such as a quinone or metal oxide, respectively. Additional embodiments also include those wherein one of the positive and negative electrodes comprises a non-stationary solid or semi-solid composition and the other electrode is stationary with respect to its corresponding current collector.

BRIEF DESCRIPTION OF THE DRAWINGS

The subject matter is described with respect to the drawings, which are intended to be illustrative in nature and not intending to be limiting of the invention, the full scope of which is set forth in the claims that follow.

FIG. 3 is a series of illustrations demonstrating the charging of capacitive particles and migration of the electrolyte ions as a function of time.

FIG. 4 also shows exemplary redistribution of ions as a function of charging, when the supercapacitive electrode particles are porous.

FIG. 9 shows a schematic illustration of an embodiment of a parallel arrangement of charge cells. While FIG. 9A and FIG. 9B are drawn separately for the clarity of the viewer, it is intended in this embodiment that the two Figures overlap, such that each stream shares corresponding semi-permeable separator and set of collectors.

(FIG. 12($a$-$c$)) and volume-weighted pore size distributions FIG. 12($d$-$f$) for materials used in Experimental Series 2, below. In particular, data for TiC-CDC (FIG. 12($a,d$)), MAST 125-250 (FIG. 12($b,e$)), and Antoxineer spherical active carbon granules (FIG. 12($c,f$)) are shown. MAST 125-250 and MAST 250-500 yielded consistent values. FIG. 12($g$) shows rheometry of both 3:1 and 4:1 liquid-solid mixtures of CB01 at 25° C. in aqueous and polycarbonate electrolyte, as described in Experimental Series 2, Section 1.

FIG. 13($a$) shows a configuration where charged and discharged slurries are stored in separate containers, the size of which is determined by the energy requirements of the system.

FIG. 16(a) shows scan rate versus capacitance plot showing the absolute specific capacitance and FIG. 16(b) shows the normalized capacitance (100%=maximum capacitance). The rate handling abilities of all beads are very similar when compensating for the different absolute gravimetric capacitance but remain below the values for TiC-CDC (b). All measurements were carried out in 1 M $Na_2SO_4$ (aq) with the addition of 10 wt % carbon black as a conductive additive FIG. 17 provides data from Experimental Series 2, below, including chronoamperometry data for CB01 in 1.25M TEA-$BF_4$ in PC. After a 30 min conditioning period (full discharge to 0 V), the cell was charged to 2.7, 2.5, 2.0, 1.8, 1.5, 1.0, 0.75, and 0.50 V, as shown in the V-t plot (a). While charging was associated with additional leakage current, the integration of the discharge current versus time plot (FIG. 17(a)) directly yields the charge for a given cell potential (FIG. 17(b)). The latter exhibits an almost ideal linear dependency on the cell potential which (i) shows that indeed equilibrium capacitance was measured and (ii) that the resulting capacitance (A·s/ $_V$=F) is largely independent of the cell potential within the studied voltage range.

DESCRIPTION OF ILLUSTRATIVE EMBODIMENTS

Figure 1:
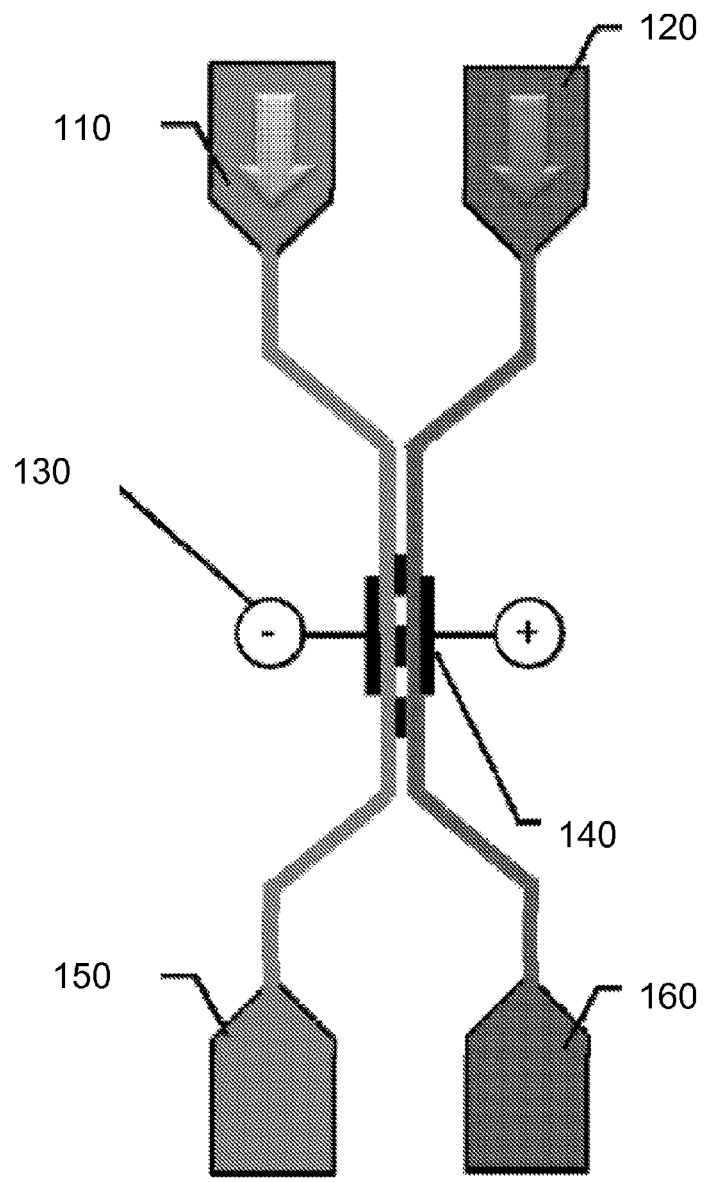
FIG. 1 is a schematic illustration of one embodiment of the electrochemical flow capacitor.

The present invention may be understood more readily by reference to the following detailed description taken in connection with the accompanying Figures and Examples, which form a part of this disclosure. It is to be understood that this invention is not limited to the specific products, methods, conditions or parameters described and/or shown herein, and that the terminology used herein is for the purpose of describing particular embodiments by way of example only and is not intended to be limiting of any claimed invention. Similarly, unless specifically otherwise stated, any description as to a possible mechanism or mode of action or reason for improvement is meant to be illustrative only, and the invention herein is not to be constrained by the correctness or incorrectness of any such suggested mechanism or mode of action or reason for improvement. Throughout this text, it is recognized that the descriptions refer both to the devices and to the methods of using the devices.

In the present disclosure the singular forms "a," "an," and "the" include the plural reference, and reference to a particular numerical value includes at least that particular value, unless the context clearly indicates otherwise. Thus, for example, a reference to "a material" is a reference to at least one of such materials and equivalents thereof known to those skilled in the art, and so forth.

When values are expressed as approximations by use of the antecedent "about," it will be understood that the particular value forms another embodiment. In general, use of the term "about" indicates approximations that can vary depending on the desired properties sought to be obtained by the disclosed subject matter and is to be interpreted in the specific context in which it is used, based on its function, and the person skilled in the art will be able to interpret it as such. In some cases, the number of significant figures used for a particular value may be one non-limiting method of determining the extent of the word "about." In other cases, the gradations used in a series of values may be used to determine the intended range available to the term "about" for each value. Where present, all ranges are inclusive and combinable. That is, a reference to a value stated in ranges includes each and every value within that range.

It is to be appreciated that certain features of the invention which are, for clarity, described herein in the context of separate embodiments, may also be provided in combination in a single embodiment. Conversely, various features of the invention that are, for brevity, described in the context of a single embodiment may also be provided separately or in any subcombination. Similarly, while an embodiment may be described as part of a series of steps or part of a more general composition or structure, each said step may also be considered an independent embodiment in itself.

The present invention(s) share(s) the major advantages of both supercapacitors and flow batteries, providing rapid charging/discharging while enabling the decoupling of the power and energy ratings. As in supercapacitors, energy may be stored in the electric double layer of charged supercapacitive particles. A unique aspect of this new concept is the use of a non-stationary (including moveable or flowable with respect to the relevant current collector) solid or semi-solid composition comprising supercapacitive particles and an electrolytic solvent for capacitive energy storage. Unlike flow batteries, charging occurs very fast yet power output and energy storage are decoupled, overcoming the major limitation of supercapacitors: their moderate energy density.

Various embodiments of this invention provide energy storage devices comprising: (a) a positive electrode current collector, a negative electrode current collector, and an ion-permeable separator separating the positive and negative electrode current collectors; (b) a positive electrode disposed between the positive electrode current collector and the ion-permeable separator; (c) a negative electrode disposed between the negative electrode current collector and the ion-permeable separator and in electrical communication with the negative electrode current collector; wherein at least one of the positive and negative electrodes comprises a non-stationary (including moveable or flowable, with respect to the relevant current collector) solid or semi-solid composition comprising supercapacitive particles and an electrolytic solvent; and wherein the supercapacitive particles and the electrolytic solvent is substantially free of electrochemically oxidizable or reducible species. In some embodiments, at least one of the electrodes are in electrical communication with at least a portion of the respective electrode current collector. In some embodiments of the device and the methods of operating an energy storage device and of storing or releasing energy, both the positive and negative electrodes comprise a non-stationary (including moveable or flowable, with respect to the relevant current collector) solid or semi-solid composition comprising supercapacitive particles and an electrolytic solvent; and wherein the electrolytic solvent is substantially free of electrochemically oxidizable or reducible species. Similarly, certain embodiments provide devices or methods wherein one of the two electrodes comprises supercapacitive particles and an electrolytic solvent which contains electrochemically oxidizable or reducible species, for example in a pseudocapacitive system, provided the other electrode is substantially free of such oxidizable or reducible species. In still further separate embodiments, one or both of the two electrodes contains electrochemically oxidizable or reducible species known as pseudocapacitive materials. Said pseudocapacitive materials may be organic or inorganic, such as a quinone or metal oxide, respectively. Additional embodiments also include those wherein one of the positive and negative electrodes comprises a non-stationary solid or semi-solid composition and the other electrode is stationary with respect to its corresponding current collector.

As used herein, unless otherwise specifically indicated, the term "energy storage device" includes the conformation of the device wherein energy can be stored (i.e., the electrode particles are charged) and wherein energy can be harvested (i.e., the electrode particles are discharged).

The positive electrode current collector and the ion-permeable separator may be envisioned as defining a positive capacitive zone accommodating the positive electrode. Similarly, the negative electrode current collector and the ion-permeable separator defining a negative capacitive zone accommodating the negative electrode. These capacitive zones may also be referred to, either individually or collectively, as the charging or discharging cell of the device. In certain embodiments, the device also comprises at least one reservoir, preferably two reservoirs, acting as a source(s) for the solid or semi-solid composition before entering the appropriate capacitive zone. In other embodiments, the device also comprises at least one reservoir acting as a receiver for the solid or semi-solid composition after leaving the appropriate capacitive zone.

In other embodiments, both of the positive and negative electrodes independently comprise non-stationary solid or semi-solid compositions comprising supercapacitive particles and an electrolytic solvent. In still other embodiments, both electrolytic solvents are the same. In other embodiments, the electrolytic solvents are different.

As used herein, semi-solid refers to a mixture of liquid and solid phases, such as a slurry, particle suspension, heterogeneous mixture, fluidized bed, or colloidal suspension. Solid compositions may include gels, including gels solvated by the solvents described herein.

In some embodiments, the negative electrode can be a conventional stationary electrode, while the positive electrode includes a supercapacitive composition. In other embodiments, the positive electrode can be a conventional stationary electrode, while the negative electrode includes a supercapacitive composition.

The current collector is generally electrically conductive and should be electrochemically inactive under the operation conditions of the cell. Typical current collectors include copper, aluminum, or titanium for the negative current collector and aluminum for the positive current collector, in the form of sheets or mesh, or any configuration for which the current collector may contact the non-stationary electrode and permit fluid flow. Selection of current collector materials is well-known to those skilled in the art. In some embodiments, aluminum is used as the current collector for positive electrode. In some embodiments, copper is used as the current collector for negative electrode. In other embodiments, aluminum is used as the current collector for negative electrode. In still other embodiments, current collectors may comprise stainless steel, noble metals, carbon, or combinations thereof.

The present invention is significantly different from other flowable energy storage devices in that it stores energy capacitively, or electrostatically, rather than electrochemically by redox chemical methods. As used herein, the term "supercapacitive particles" refers to those particles as capable of exhibiting the essential characteristics of an electrical double layer capacitor; i.e., able to store charges on the surface of the particles. In some embodiments, these particles may contain or comprise other materials, including pseudocapacitive materials, either internally (e.g., embedded nanoparticles) or on their surface (e.g., with surface coatings or tethered groups) or a combination thereof, to the extent that these additional materials do not materially affect the ability of the supercapacitive particles to act in their intended function.

Supercapacitors, also called ultracapacitors or electrochemical or electric double-layer capacitors (EDLCs), store energy by charge separating ions in an electrolytic solution with a non-interacting electrode, using an accumulation of ions of opposite charge in a double layer at electrochemically-stable high specific surface area electrodes. EDLCs do not have a conventional dielectric. Rather than two separate plates separated by an intervening substance, these capacitors use "plates" that are in fact two layers of the same substrate, and their electrical properties, the so-called "electrical double layer," result in the effective separation of charge despite the vanishingly thin (on the order of nanometers) physical separation of the layers. The lack of need for a bulky layer of dielectric permits the packing of "plates" with much larger surface area into a given size, resulting in extraordinarily high capacitances in practical-sized packages.

In an electrical double layer, each layer by itself is quite conductive, but the physics at the interface where the layers are effectively in contact means that no significant current can flow between the layers. The high surface to volume ratio of the active material promotes the energy and power densities of EDLCs, and is further enhanced in micro-supercapacitors. By offering fast charging and discharging rates, and the ability to sustain millions of cycles, electrochemical capacitors bridge the gap between batteries, which offer high energy densities but are slow, and conventional electrolytic capacitors, which are fast but have low energy densities.

EDLCs have much higher power density than batteries. In fact, while existing EDLCs have energy densities that are perhaps 1/10th that of a conventional battery, their power density is generally 10 to 100 times as great. The relatively low energy densities of conventional, stationary EDLCs are surmounted in the present invention, which, because of the extremely flexible scalability, especially in their ability to store energy in separate reservoirs, significantly improves the energy densities of the supercapacitive systems.

While, in certain embodiments, the electrode materials may accept and hold an electrostatic charge, they are not subject to any appreciable redox reactions and preferably not subject to any redox reactions, in the sense that battery electrodes are. Such materials are electrically conductive or semi-conductive. Typical materials used for the supercapacitive particles include carbon black, activated carbon, graphene or graphitic carbon, carbon nanotubes, nanorods, or nanowires, carbon aerogels, and certain electrically conducting metals (e.g., Pt, Pd, Au), oxides, carbides, and conductive polymers. Each of these forms may be used in the present invention. More recently, Gogotsi, et al. and others have described the use of nanoporous carbide-derived carbon and alliform carbon for use in supercapacitor applications. For example, see WO 2008/069833; WO/2009/123784; and U.S. Provisional Application No. 61/383,951, respectively, each of which is incorporated by reference herein in its entirety. In certain embodiments of the present invention, the supercapacitive particles comprise carbon, more preferably in the form of carbon black, graphitic carbon, glassy carbon, carbide-derived carbon, or alliform carbon. In other embodiments, these carbon forms may be fully or partially metal-coated to enhance conductivity.

In various embodiments, the carbon particles comprise carbon atoms having $sp^2$ and $sp$ hybridization with sizes the range from the nanometer scale to 1000 microns and have a high surface area associated with porosity, resulting in a large surface area in excess of 2500 $m^2$/gram, where most of the pores are accessible to the electrolytic solution and its ions. The carbon material is both conductive and can hold charge either negative or positive depending on whether it is located within, or have passed through, the positive or negative capacitive zone, respectively. The charge can redistribute throughout the particles via both inter and intra particle charge transfer and the ions of the electrolyte of opposite charge can readily migrate to a position within several Angstroms of the charge in the majority of cases, though the prevent invention is not limited to this electrolyte charge position or degree of separation.

As regarding the supercapacitive electrode materials, higher energy densities can be achieved at higher surface areas of the supercapacitive particles. This can be achieved by using small particle sizes or highly porous, mesoporous, or nanoporous particles, or combinations of each. Various embodiments encompass those particles having mean particle diameters of less than 1000 microns, less than 500 microns, less than 100 microns, less than 50 microns, and less than 2.5 or 1 micron. More specific embodiments include those wherein the range of mean particle diameters have an upper limit of 1000 microns, 500 microns, 250 microns, 100 microns, 50 microns, 25 microns, 10 microns, and 5 microns and a lower limits of 1 micron, 5 micron, 10 microns, 25 microns, 50 microns, 100 microns, and 250 microns, consisting of any combination of upper and lower limits as allowed by logic. For example, non-limiting illustrative examples includes those embodiments, wherein the supercapacitive particles have mean particle diameters in the range of about 1 micron to about 500 microns, or about 250 microns to about 400 microns. Even smaller mean particle diameters down to nanometer-sized particles may also be employed as colloidal solutions, for example, wherein the lower limit of the ranges described above is 2 nm, 5 nm, 10 nm, or 100 nm, though compositions comprising too fine a solid phase can inhibit the power and energy of the system by "clogging" the current collectors. In one or more embodiments, the semi-solid flowable composition contains very fine primary particle sizes for charging rate, but where the very fine particles are aggregated into larger agglomerates. Commercially available carbon blacks, which can comprise aggregate clusters as small as 50 nm made up of individual particles as small as 5 nm, are available and work well as electrode materials in various embodiments of this invention. In some embodiments, the supercapacitive particles in the positive or negative flowable electrode compositions are present in a porous aggregate of 1 micrometer to 1000 micrometer average diameter.

A low inter-particle connectivity can negatively affect the rate-performance and the charge transfer efficiency of electrodes. This aspect can be addressed by optimizing the size of the supercapacitive particles, but there should be a balance of flowability (which favors low solid/liquid ratios) and charge transfer efficiency (which favors high solid/liquid ratios). While a narrow particle size distribution is desirable to avoid granular convection, the flowability and particle contact would both directly benefit through the use of smaller particles.

In some embodiments, the energy storage device comprises a relatively non-stationary solid or semi-solid composition comprising supercapacitive particles and electrolytic solvent in a weight ratio in the range of about 2:1 to about 5:1, preferably in a weight ratio in the range of about 3:1 to about 4:1. Additionally, these ratios may change with time or with respect to positioning in the device or system.

In other embodiments, carbon electrode materials are comprised of macroporous carbon, mesoporous carbon, or nanoporous carbon or combinations of each. As used herein, the term "mesoporous" is characterized as having a plurality of pores characterized as having an average cross-sectional dimension greater than about 50 nm. As used herein, the term "mesoporous" is characterized as having a plurality of pores characterized as having an average cross-sectional dimension in the range of from about 2 nm and about 50 nm; in the range of from about 2.5 nm and about 25 nm; or in the range of from about 5 nm and about 10 nm. As used herein, the term "nanoporous" is characterized as having a plurality of nanopores characterized as having an average cross-sectional dimension in the range of from about 0.2 nm and about 2.5 nm; in the range of from about 0.5 nm and about 2.0 nm; or in the range of from about 0.7 nm and about 1.0 nm. These pore sizes may be determined using various well established techniques, including porosimetry. Where the supercapacitive particles (including pseudocapacitive particles) comprise carbon, various embodiments include those wherein the carbon particles are micron- or submicron-sized spheres. Spherical carbon particles having particles size of a few micrometers or less may be obtained, for example, via hydrothermal syntheses. Submicrometer-sized mesoporous carbon spheres can be derived, for example, from templating syntheses.

The invention is flexible in its ability to use various types of non-stationary solid or semi-solid compositions. In various embodiments, these compositions are flowable dispersion or slurry of supercapacitive particles and an electrolytic solvent. The range of electrode particle loadings is flexible, and depends on the individual choice of particle type, solvent, and operating temperature and pressure. As may be expected, though, the loadings must be chosen so as to provide slurry or dispersion viscosities which allow flow through the device at the temperature and pressure chosen. As but one indication, in some embodiments, steady state shear viscosity of the flowable semi-solid electrode composition of the energy storage device is between about 1 cP and 1,000,000 cP at the temperature of operation of the energy storage device. In some embodiments, the viscosity of the electrode undergoing flow is less than about 10,000 cP. In other embodiments, the viscosity is between about 100 cP and 10,000 cP. In those embodiments where a semi-solid is used, the volume percentage of ion-storing solid phases may be between 5% and 70%, and the total solids percentage including other solid phases such as conductive additives may be between 10% and 75%. In some embodiments, the cell "stack" where charging occurs operates at a higher temperature to decrease viscosity or increase reaction rate, while the receiver tanks for the semi-solid may be at a lower temperature.

As shown in the Figures described more fully below, embodiments of the device comprise at least paired sets of non-stationary solid or semi-solid compositions passing through the device. It should be appreciated that the architecture of the device may also include multiple pairs of such electrodes, which may be arranged horizontally or vertically, in parallel (e.g., FIG. 9) or in series (e.g., FIG. 10). Such multiple pairs of electrodes may be stacked in a sandwich type or concentric tube-in-shell-type configuration. Additionally, in various other embodiments, multiple positive electrodes may share a common negative electrodes and/or multiple negative electrodes may share a common positive electrode. In still other embodiments, different cells, or portions of cells, may be connected to different voltage potentials during charging or current collectors during discharging, and may operate at different charge/discharge rates.

In other embodiments, the non-stationary solid or semi-solid composition is a tape of supercapacitive particles and an electrolytic solvent, capable of moving through the capacitive cell arrangement. These tapes may be free standing or may comprise matrices supported by chemically compatible, electrically non-conductive carrier sheets, wherein the matrices comprise various binder systems used in the art for similar applications. Non-limiting examples including ionomers, polyester, poly(meth)acrylates (polyacids and/or or polyesters), polyvinylidene difluoride (PVDF), polytetrafluoroethylene (PTFE), or polyvinyldichloride (PVDC), and are well known to those skilled in the art. These tapes must be capable of providing or allowing the ion mobility necessary for the operation of the energy storage device. Accordingly, in certain embodiments, the tapes contain the electrolytic solvents within the matrices of the tapes; e.g., in a gel arrangement. In other embodiments, the ion mobility is provided by passing a solvent-free or solvent-deficient tape through an electrolytic solvent during the operation of the capacitive cell.

In the operation of the device, separate tapes will exist for carrying the positively charged supercapacitive electrode material and the other for negatively charged supercapacitive electrode material, though compositionally, the tapes may otherwise contain the same or different chemistries. In certain embodiments, for purposes of handling and energy storage, each tape is capable of being wound and/or may be wound up onto spools. In some cases, the tapes may be provided in a configuration similar to, but not limited to, those found in the two spools of a VHS tape, where spools can be considered similar to reservoirs. Where one spool of a single tape will be for charged supercapacitive electrode material and the other spool will be for uncharged electrode supercapacitive material.

The supercapacitive electrode material may be applied continuously throughout or along the surface of the tape, or in electrically isolated segments within or along the surface of the tape.

In the present application, the presence of an electrolytic solvent is necessary to allow the ions to migrate from one electrode to the other during the operation of the device. As used herein, the term "electrolytic solvent" refers either to a solvent comprising at least one electrolyte, or a solvent which itself is an electrolyte; i.e., an ionic liquid. The preferred electrolyte is characterized by poor electron mobility and high ion mobility. The electrolyte itself is intended to be highly conductive in the sense that it would have a high ion mobility that is, the ability to quickly redistribute the positive and negative ions in an unbalanced manner between the positive and negative electrode or in local regions within the positive or negative electrode. Further the electrolyte is not intended to function through an electron (charge) transfer mechanism nor would the energy storage device operate in such a way that is the redox active range of the electrolyte used will be outside the potential range that will be used to charge the supercapacitive electrode particles. Generally, the kinetics of the ion mobility, especially through the ion-permeable separator, define the design parameters of the device.

In certain embodiments of the present invention(s), the electrolytic solvent of at least one electrode is very poorly and preferably not at all redox active. That is, in the embodiments of the present invention, the electrolytic solvent is substantially free of electrochemically reversible oxidizable or reducible species. Otherwise, the stored energies can be subject to degradation. In this way, the present invention is distinguished from that of Chiang, et al., U.S. Patent Application Publication 2010/0047671, wherein the electrodes comprise liquids which must be redox-active in order to operate.

It is envisioned that the range of electrical potentials used for charging the supercapacitive electrodes particles is at a lower potential than the redox active range of either the supercapacitive electrodes particles or the electrolytic solution, or both. All supercapacitive electrode materials, including carbon electrode materials, and electrolytic solutions undergo some degree of degradation after usually greater than 100,000 charge/discharge cycles. Further, in those embodiments where this charge discharge cycle is not redox active (e.g., EDLCs) or comprise pseudocapacitive materials, the useful life and number of charge/discharge cycles far exceeds that of a battery. This degradation occurs mainly through the irreversible oxidation or reduction of the electrode material(s) or the electrolyte. This degradation tends to affect the performance of the electrode material(s) or electrolyte over time. While the system may ultimately exhibit some irreversible redox behavior in the charge/discharge potential window it is not beneficial to the performance of the electrode material(s) nor is such a process intended.

In various embodiments, the electrolyte solvent is aqueous, and comprises one or more soluble electrolyte comprising a halide, sulfate, hydroxide, nitrate, or other anions. In certain embodiments, these anions are inert under the operating conditions contemplated.

In other embodiments, the electrolytic solvent comprises a polar organic solvent, such as an alcohol or aprotic organic solvent. The choice of polar organic solvents may include those traditionally used for flow battery applications. Preferred polar organic solvents include aliphatic nitriles including acetonitrile and propionitrile, aliphatic esters including ethyl acetate, methyl propionate, ethyl propionate, γ-butyl lactone, dimethylformamide, 1,2-dimethoxyethane, cyclic or diallylcarbonate esters including dimethyl carbonate, diethyl carbonate, dipropyl carbonate, ethylene carbonate, propylene carbonate, nitromethane, sulfolane, or methylsulfalone. These solvents further comprise a soluble electrolyte comprising an anion-cation pair, wherein the choice of cation includes an alkali metal, an alkaline earth metal, a lanthanide, a tetraalkyl ammonium cation, aluminum or zinc and the choice of anion includes $OH^-$, $PF_6^-$, $ClO_4^-$, $BF_4^-$, $CF_3SO_3^-$, or $SbF_6^-$.

The flowable electrode compositions can include various additives to improve the performance of the device—i.e., the flowability and stability of the slurry or dispersion. In some embodiments, it is preferred that the slurry or suspension be stable with respect to settling; in other embodiments, this feature is not required, or even desired. As used herein, a slurry or dispersion is considered "stable" when there is no observable particle settling in the suspension. In some embodiments, the electrode composition is stable for at least 1 day, at least 2 days, at least 5 days, or at least 30 days. The liquid phase of the semi-solid slurry in such instances would comprise a solvent, in which is dissolved an electrolyte salt, and binders, thickeners, or other additives added to prevent settling and improve stability of the system, provided such binders, thickeners, or other additives do not compromise the operation of the device. Such binders, thickeners, or other additives are well known to those in the art. In some embodiments, the shear flow produced by the pumps provides additional stabilization of the suspension.

In still other embodiments, the electrolytic solvent is an ionic liquid. As a class of materials, ionic liquids are attractive because of their non-volatility over a broad operating temperature window (e.g., either within or beyond the range of about −50° C. to about +100° C.), coupled with their wide usable voltage window. Ionic liquids may include those wherein the cation is ethylmethylimmidazolium, tetraalkylammonium, dialkylimidazolium, trialkylimidazolium, tetraalkylimidazolium, alkylpyridinium, dialkylpyrrolidinium, dialkylpiperidinium, tetraalkylphosphonium, trialkylsulfonium, or any combination thereof. Similarly, the ionic liquid comprises an anion of $BF_4$, $B(CN)_4$, $n-C_3F_7BF_3$, $CH_3BF_3$, $CH_2CHBF_3$, $CF_3BF_3$, $C_2F_5BF_3$, $n-C_4F_9BF_3$, $PF_6$, $CF_3CO_2$, $CF_3SO_3$, $N(SO_2CF_3)_2$, $N(COCF_3)(SO_2CF_3)$, $N(SO_2F)_2N(CN)_2$, $C(CN)_3$, SCN, SeCN, $CuCl_2$, $AlCl_4$, spyro-bipyrrolidinium, or any combination thereof. A preferred combination is ethyl-methyl immidazolium-trifluoromethane-sulfonyl imide.

In other embodiments, the ionic liquid further comprises zwitterions (i.e., a molecule having a positive and a negative electrical charge on different atoms within the molecule), whereby the resulting fluid comprises any ratio of the zwitterions and ionic liquid. Specific embodiments of this includes those mixtures of zwitterions to free ions in the range of from about 1:1000 to about 1000:1; in the range of from about 1:100 to about 100:1; and in the range of from about 1:10 to about 10:1, in each case in molar proportions.

Varying the electrode pore size(s) relative to the dimensions of the solvated ions (i.e., the size of the ions including their respective solvate spheres) provides for specific features described below. In various embodiments, the energy storage device is characterized by a porous or nonporous carbon material where, when uncharged, both anions and cations reside in the pores or on the surface of the material in similar concentrations.

As has been previously described in WO 2008/069833 and WO/2009/123784, both of which are incorporated by reference for this purpose, the relative dimensions of one or more of the solvated ions (i.e., the size of the ions including their respective solvate spheres) and the nanopores can affect the energy density of the device. Accordingly, in certain embodiments, devices comprises compositions wherein the solvated electrolyte is characterized as residing at least partially within one or more nanopores of the composition. In other embodiments, devices comprises compositions wherein the relative dimensions of the solvated ions and the nanopores such that the average nanopore size is approximately equal to or less than the average diameter of the solvated ions of the electrolyte.

The ion-permeable separator keeps the individual electrodes separate from one another, and provides a conduit for the movement of the ions within the device. The ion-permeable separator may be a membrane, and if so, may be any conventional membrane capable of ion transport. In one or more embodiments, the membrane is a liquid-impermeable membrane that permits the transport of ions therethrough, namely a solid or gel ionic conductor. In other embodiments the membrane is a microporous polymer membrane infused with a liquid electrolyte that allows for the shuttling of ions between the capacitive zones of the device, while preventing the transfer of electrons. Typical membrane materials may comprise, for example, ceramic or natural or synthetic organic polymer or gel-polymer materials. Various types of ion separators are described in Arora, et al., *Chem. Rev.* 2004, 104, 4419-4462, the teachings of which are incorporated by reference herein. In various embodiments, the ion-permeable separator comprises a polyolefin, a fluorinated polymer, a sulfonated polymer, an alkoxylate polymer, a ceramic, or a copolymer or physical mixture or laminate thereof. Polyethylene, polypropylene, polyethylene oxide, PMMA, PVDF, PTFE, and Nafion® represent non-limiting exemplary materials for use in these embodiments.

The spacings between each respective current collector and the ion-permeable membrane may be the same or may be different. In some embodiments, the positive current collector and the ion-permeable separator are separated by a first spacing distance and the negative current collector and the ion-permeable separator are separated by a second spacing distance. These distances may be described in terms relative to the sizes of the supercapacitive particles passing through the associated capacitive zones, such that at least one of the first or second spacing distances (or both) is in the range of about 2 times to about 1000 times the mean diameter of the supercapacitive particles passing therethrough, preferably in the range of about 2 to about 10 times or about 5 to about 10 times the mean diameter of the supercapacitive particles.

In certain embodiments, it is advantageous to use a relatively shallow channel geometry for each capacitive zone; i.e., the mean depth of the channel (thickness of the capacitive zone defined by the distance between the current collector and the ion permeable electrode) is less than the mean width of the collector and the ion permeable electrode allows free passage of the slurry without clogging. In certain independent embodiments, the ratio of depth to width is about 1:500, 1:100, 1:10, 1:5, 1:2, 1:1. In other embodiments, the ratio of depth to width is about 1:2, 1:5, 1:10, or even higher, thereby reflecting a relatively deeper channel, for example. While the cross-section of one or both capacitive zones may have a constant cross-section across the length of the capacitive zone, the present invention is not so limited. In some embodiments, the cross-section of one or more capacitive zones may increase or decrease along the direction of the movement of the electrode material, or may otherwise vary along this same direction (e.g., increase-decrease-increase, or decrease-increase-decrease), wherein the changes in channel dimensions are continuous or stepwise, or a combination of both.

The invention also teaches methods of storing and releasing energy, and using or operating the devices described herein.

Various embodiments provide methods of operating an energy storage device, (a) said energy storage device comprising: (i) a positive electrode current collector, a negative electrode current collector, and an ion-permeable separator separating the positive and negative electrode current collectors; (ii) a positive electrode disposed between the positive electrode current collector and the ion-permeable separator and in electrical communication with the positive electrode current collector; the positive electrode current collector and the ion-permeable separator defining a positive capacitive zone accommodating the positive electrode; (iii) a negative electrode disposed between the negative electrode current collector and the ion-permeable separator and in electrical communication with the negative electrode current collector; the negative electrode current collector and the ion-permeable separator defining a negative capacitive zone accommodating the negative electrode; wherein at least one of the positive and negative electrodes comprises a non-stationary solid or semi-solid composition comprising supercapacitive particles and an electrolytic solvent; and wherein the electrolytic solvent is substantially free of electrochemically oxidizable or reducible species; said method comprising: (b) transporting at least one non-stationary solid or semi-solid composition into at least one capacitive zone during the operation of the device.

Various embodiments also provide methods of storing energy using an energy storage device, (a) said energy storage device comprising (i) a positive electrode current collector, a negative electrode current collector, and an ion-permeable separator separating the positive and negative electrode current collectors; (ii) a positive electrode disposed between the positive electrode current collector and the ion-permeable separator and in electrical communication with the positive electrode current collector; the positive electrode current collector and the ion-permeable separator defining a positive capacitive zone accommodating the positive electrode; (iii) a negative electrode disposed between the negative electrode current collector and the ion-permeable separator and in electrical communication with the negative electrode current collector; the negative electrode current collector and the ion-permeable separator defining negative capacitive zone accommodating the negative electrode; wherein at least one of the positive and negative electrodes comprises a non-stationary (including moveable or flowable) solid or semi-solid composition comprising supercapacitive particles and an electrolytic solvent; and wherein the electrolytic solvent is substantially free of electrochemically oxidizable or reducible species; said method comprising (b) transporting a portion of an uncharged non-stationary solid or semi-solid composition comprising supercapacitive particles and a solvent comprising an electrolyte into the capacitive zone; (c) applying an electric field is applied across the positive and negative electrode current collectors; and (d) exposing said portion of uncharged non-stationary solid or semi-solid composition to said electric field for a time sufficient to charge the supercapacitive particles, thereby producing a portion of charged non-stationary solid or semi-solid composition. The time to charge the supercapacitive particles may additionally include the time necessary for the electrolyte ions to migrate across the ion-permeable separator to balance the particle charges.

Other embodiments further provide for replenishing the capacitive zone with another portion of uncharged non-stationary (including moveable or flowable) solid or semi-solid composition comprising supercapacitive particles and a solvent comprising an electrolyte and repeating step (d).

While the embodiments described herein are generally described in terms such that the non-stationary solid or semi-solid electrode compositions move with respect to the current collectors (e.g., are transported or delivered into at least one capacitive zone), it should be apparent that the movement of the stationary solid or semi-solid electrode compositions may also be described as being relative to the current collectors. That is, in certain embodiments, the current collectors and/or the membranes move over or with respect to a stationary phase of solid or semi-solid electrode compositions.

The movement of the uncharged supercapacitive particles into and the charged supercapacitive particles out of the respective capacitive zones may be continuous or intermittent (e.g., stop-start, or plug flow). The choice of such movement may interdepend on the viscosities and stabilities of the respective electrodes and/or the kinetics of the system. Similarly, the efficiency of the charging will depend on various parameters, including the speed with which charge is distributed across the supercapacitive particles in the electrode composition (related to the surface conductivity and the time and degree of interconnective contact between the particles and with the respective current collector), the mobility of the electrolyte ions, the speed of migration of the ions across the ion-permeable separator(s) (i.e., the redistribution of ions) and the time given for this to occur (i.e., including the length of the capacitive zone(s) as a function of electrode flow speed).

Intermittent flow or segmented movement may be preferred, for example when the rate of movement of the ions within the semisolid or solid electrode material is fast when compared to the speed of the semisolid or solid electrode material through the capacitive cell, and/or when the electrical conductivity of the electrode material is such that the charging of the particles is substantially faster than the ability of the ions to redistribute. In these cases, it may be useful to provide the semisolid slurries to the capacitive cells in electrically isolated quantities—e.g., in sequential batch-wise flows—so as to separate the charged from uncharged portions of the flow. Similarly, in separate embodiments, these tapes may comprise electrically insulated segments of supercapacitive electrode material, designed to as to each be able to pass sequentially or in parallel through the capacitive cell. These segments may be sized so as to complement the size of the area of the respective current collector and/or ion-permeable separator. That is, in separate embodiments, the surface areas presented by these segments of supercapacitive electrode material may be less than, the same as, or greater than the surface area of the corresponding current collector and/or ion-permeable separator.

In some embodiments, the rate of charge or discharge of the device is increased by increasing the instant amount of one or both flow electrodes in electronic communication with the current collector. In other embodiments, the conductivity of the semi-solid supercapacitive material is increased by at least partially coating the particles with a conductive coating material which has higher electron conductivity than the solid, for example, a metal characterized by a having low corrosivity under the particular reaction and/or storage conditions. Individual embodiments provide that the particles are coated with about 1.5 wt %, about 3.0 wt %, about 5 wt %, about 10 wt %, about 15 wt %, or about 20 wt % metal having this low corrosivity under the reaction or storage conditions.

The means for moving the supercapacitive electrode materials through the device depend on the specific nature of the supercapacitive electrode materials. In the case of slurries or dispersions, this can be achieved by gravity, conveyorized belt, or various pumps. In smaller devices, peristaltic pumps may be effectively used to move the materials. In the case of tapes comprising supercapacitive particles, conveyor belts or spool-to-spool tension may be used. The invention should not be construed as limited by the ways in which this transport is achieved, and it is well within the skill of the ordinary artisan to achieve this effect. Again, the movement of the supercapacitive electrode materials into and out of the capacitive zones may also be achieved by moving the current collector/membrane assemblies relative to stationary supercapacitive electrode materials.

The operating temperature of the capacitive cell can be elevated as necessary to improve the ionic conductivity of the membrane or alter the viscosity of the electrode composition or the mobility of the ions therein.

In certain embodiments, the energy storage device is capable of achieving a coulombic cycle efficiencies of least about 70%, least about 75%, least about 80%, least about 85%, least about 90%, at least about 95%, at least about 96%, at least about 97%, at least about 97.5%, at least about 98%, or at least about 99%.

Once the non-stationary solid or semi-solid composition of the electrode(s) are charged, they can be stored in separate energy storage reservoirs. Additional embodiments provide structures which allow for methods, and the methods themselves, further comprising removing the charged supercapacitive particles from the capacitive zone and transporting them to an energy storage reservoir. In the case where the charged supercapacitive electrode composition is a dispersion or slurry, this reservoir may be an electrically insulated tank or similar vessel. The energy storage reservoir will store the charged supercapacitive electrode material along with some electrolytic solvent at a solids concentration ranging from about 1 vol % to about 99 vol %, though higher solids content is generally preferred if only for economic reasons. Accordingly, separate embodiments provide that the solids concentration in the energy storage reservoir be at least 40 vol %, at least 50 vol %, at least 60 vol %, at least 70 vol %, at least 80 vol %, or at least 90 vol %, the remaining volume will be occupied by electrolytic solvent.

The relative solids loadings in the energy storage reservoirs may be higher, lower, or the same as the solids loadings in the materials passing through the capacitive cells.

Figure 5A:
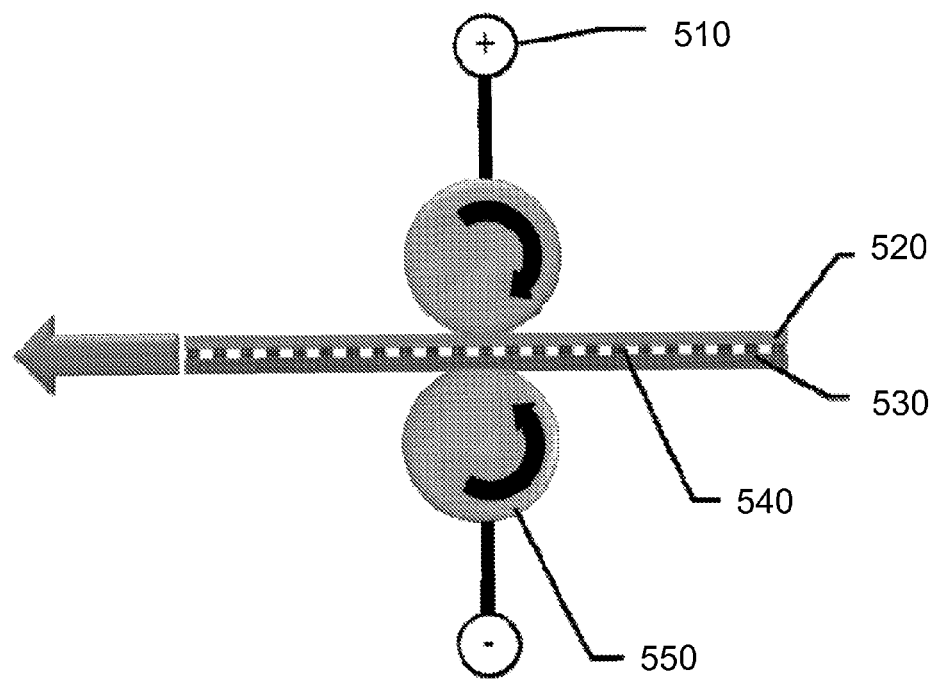
FIG. 5A and FIG. 5B illustrate the concept of the capacitive tape cell, including the reservoirs for storing the charged and uncharged tapes.
Figure 5B:
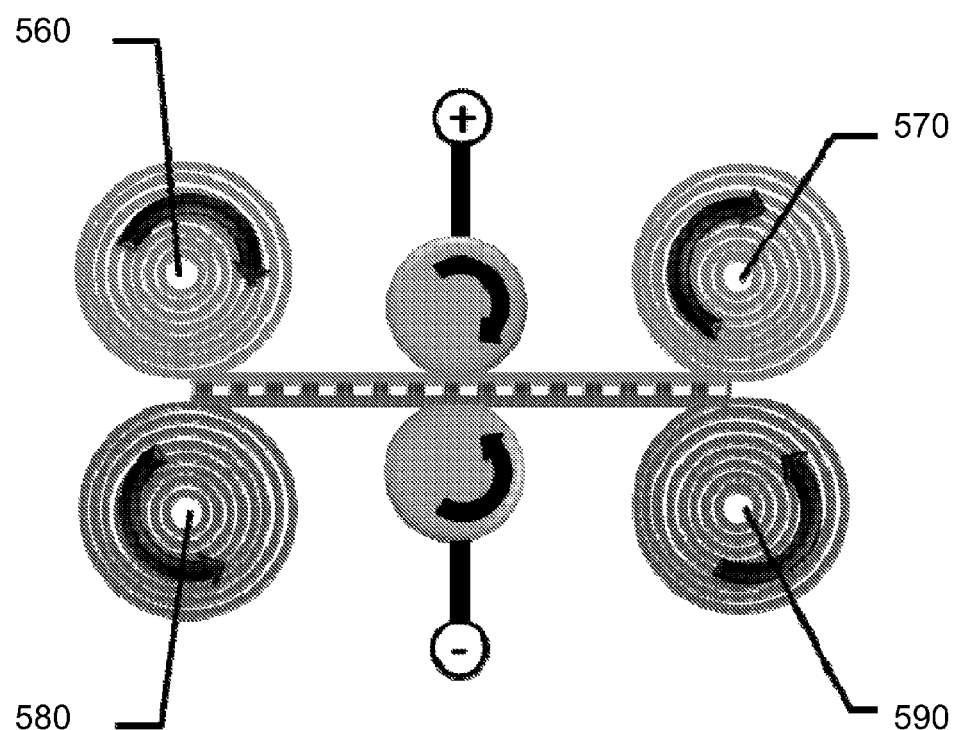

In some embodiments, the electrode particles in the semi-solid are allowed to settle, or otherwise be filtered or separated from the liquid portion, and are collected and stored separately; in other embodiments, the electrode particles and the electrolytic solvent are separated by filtration, optionally then later to be re-mixed with electrolytic solvent to form the flow electrode as needed. In special circumstances reflecting the choice of materials, these processes may be done under reduced pressure, reduced moisture, or reduced oxygen conditions. When this separation feature is further considered, the energy storage device can double (or primarily serve) as a device for desalinating sea water or other salt-containing streams (e.g., where the electrolytic solvent is brine, or some other salt, and the electrode charge and charging conditions are configured so as to partly or completely remove the brine, NaCl, or some other salt, from the incoming electrode composition). In the same way, other ions can be selectively removed from the incoming electrode composition, and the device used for cleaning said composition.

Where the charged electrode composition is a solid tape, for example, the tape may be rolled onto spools or reels for storage. See, for example, FIG. 5. In one embodiment, semi-solid A, 520, and semi-solid B, 530, pass between rotating metal current collectors 550 and ion-permeable separator 540 (while shown as rotating, the current collectors may be flat or curved). Electric potential 510 is applied across the current collectors to charge the supercapacitive electrode particles for energy storage. In a second embodiment, the supercapacitive tapes feed from spool reservoirs of uncharged electrodes 570 and 590 onto spool reservoirs 560 and 580 of charged electrodes.

In recovering the stored energy, the process is reversed. Therefore, in various embodiments, methods of releasing stored energy using a device, (a) said device comprising: (i) a positive electrode current collector, a negative electrode current collector, and an ion-permeable separator separating the positive and negative electrode current collectors; (ii) a positive electrode disposed between the positive electrode current collector and the ion-permeable separator and in electrical communication with the positive electrode current collector; the positive electrode current collector and the ion-permeable separator defining a positive capacitive zone accommodating the positive electrode; (iii) a negative electrode disposed between the negative electrode current collector and the ion-permeable separator and in electrical communication with the negative electrode current collector; the negative electrode current collector and the ion-permeable separator defining negative capacitive zone accommodating the negative electrode; wherein at least one of the positive and negative electrodes comprises a non-stationary (including moveable or flowable) solid or semi-solid composition comprising supercapacitive particles and an electrolytic solvent; and wherein the electrolytic solvent is substantially free of electrochemically oxidizable or reducible species; wherein said method comprises (b) transporting a portion of an charged non-stationary solid or semi-solid composition comprising charged supercapacitive particles, such that the charged supercapacitive particles come into electrical communication with the adjacent current collector; (c) discharging the charged supercapacitive particles through the adjacent current collector. Again, the invention also teaches that this energy releasing process further comprises replenishing the capacitive zone with another portion of charged non-stationary solid or semi-solid composition comprising supercapacitive particles and repeating step (c). Additional embodiments provide structures which allow for methods, and the methods themselves, comprising removing the discharged supercapacitive particles from the capacitive zone and transporting them to a reservoir.

Again, the types of flow and the kinetics of the ion migration affect the design and operation of the energy releasing process in a manner similar to the energy storing process. Accordingly, the same comments provided for the energy storing process apply here.

Figure 2:
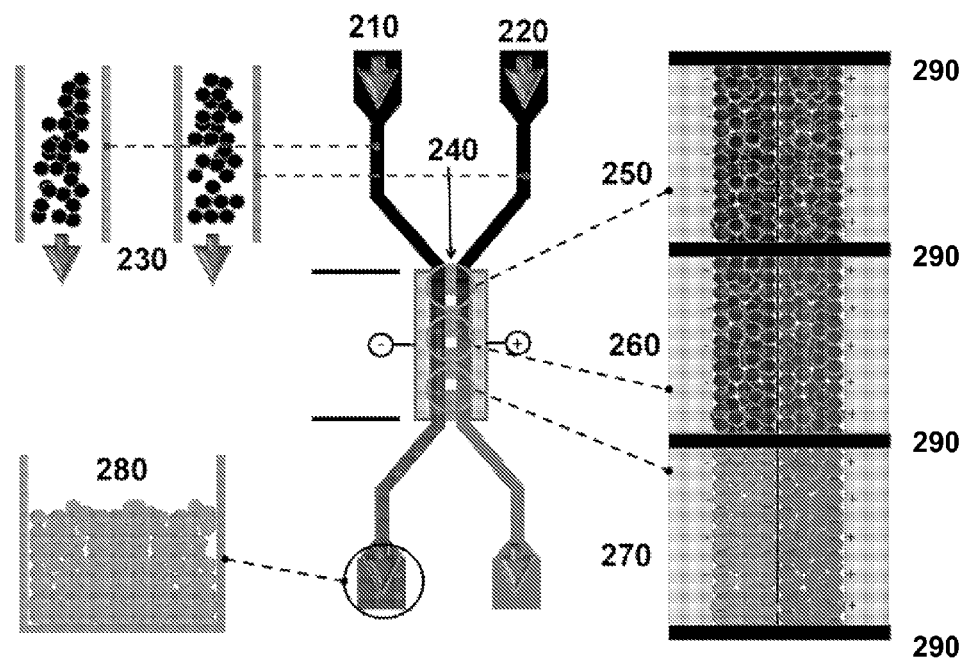
FIG. 2 is a schematic illustration of several additional embodiments of capacitive energy storage.
Figure 3A:
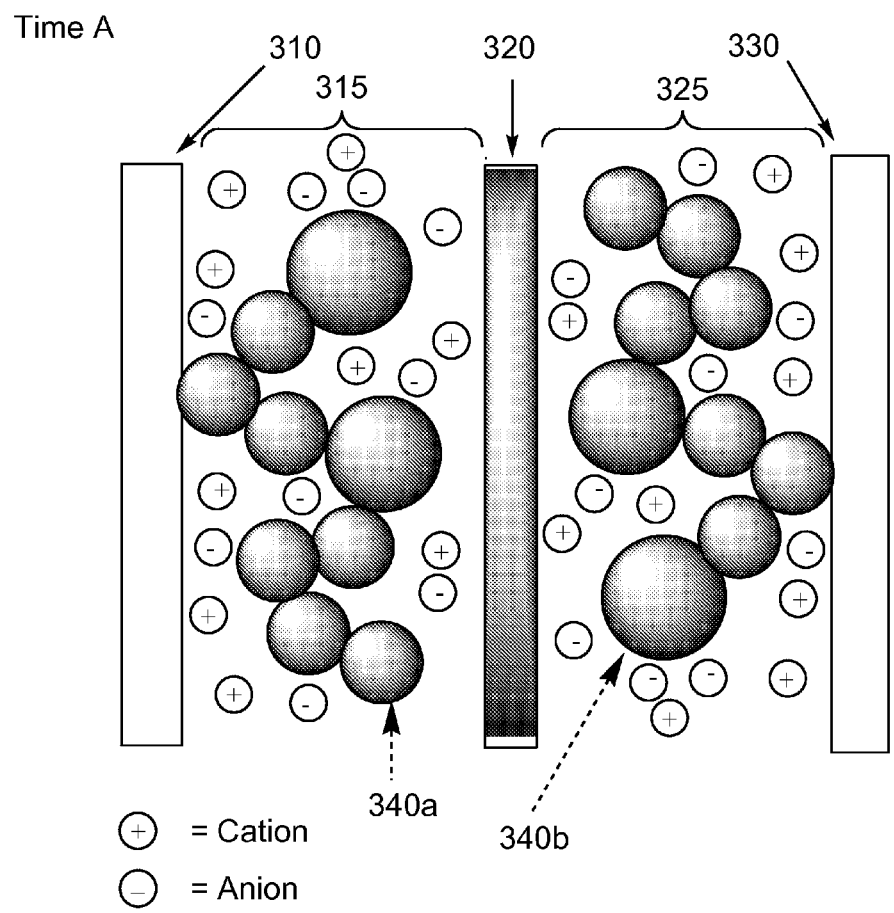
FIG. 3A illustrates the charge distributions at a time before the electrodes are charged.
Figure 3B:
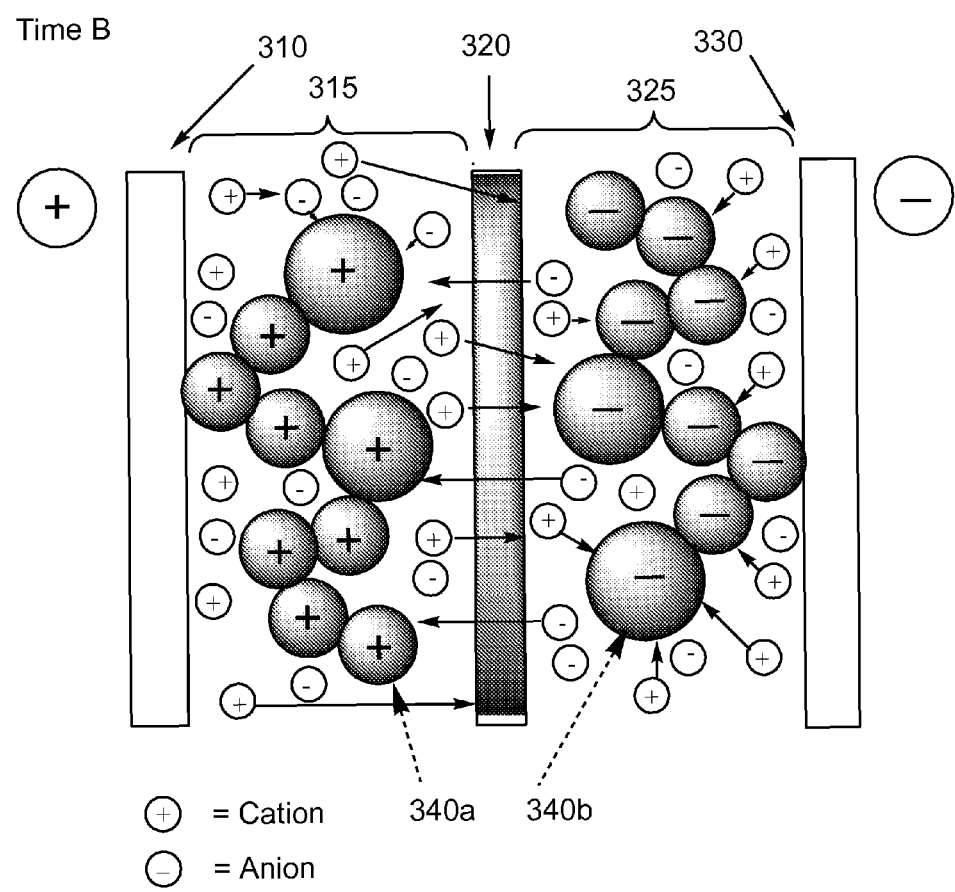
FIG. 3B illustrates the charge distributions immediately after a charge is applied across the electrodes.
Figure 3C:
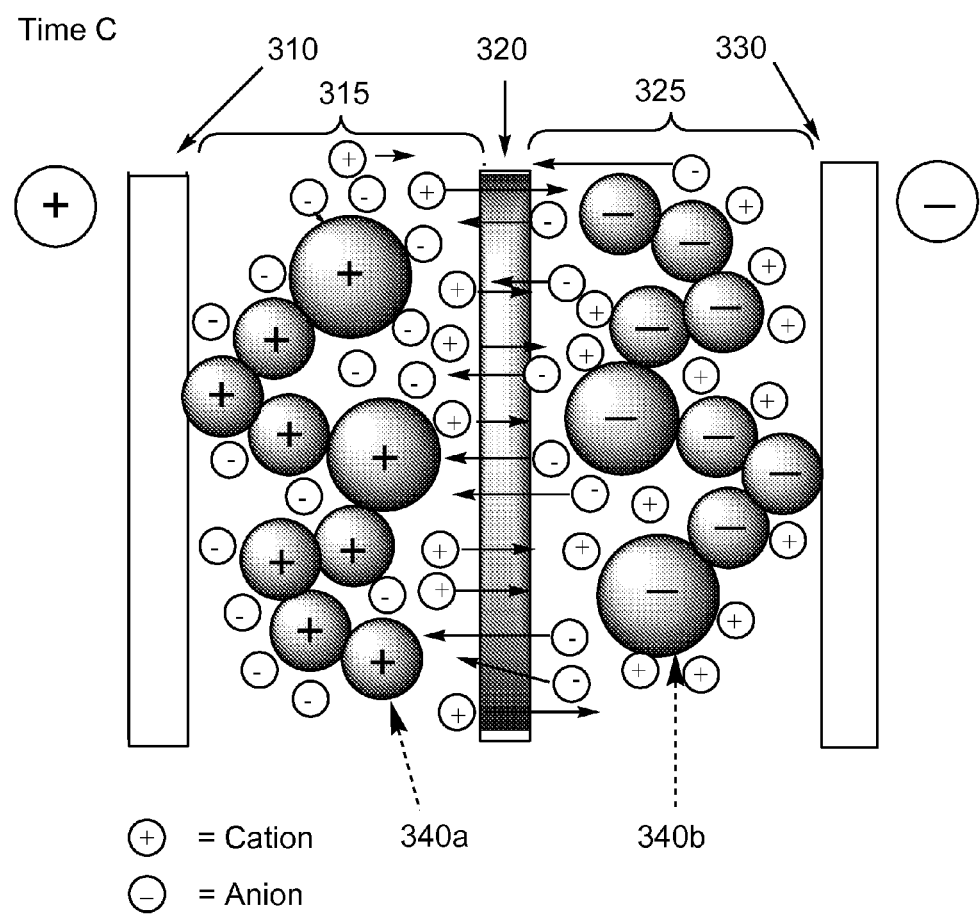
FIG. 3C and FIG. 3D illustrate the charge distributions after sequentially longer times.
Figure 3D:
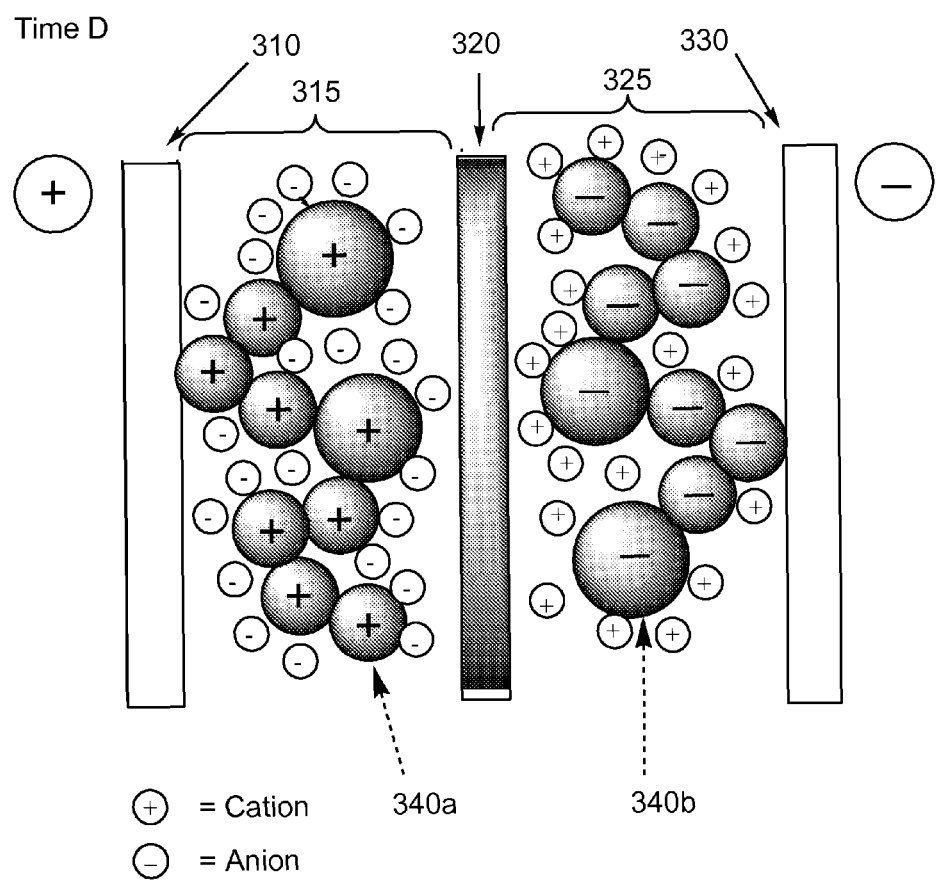
Figure 4:
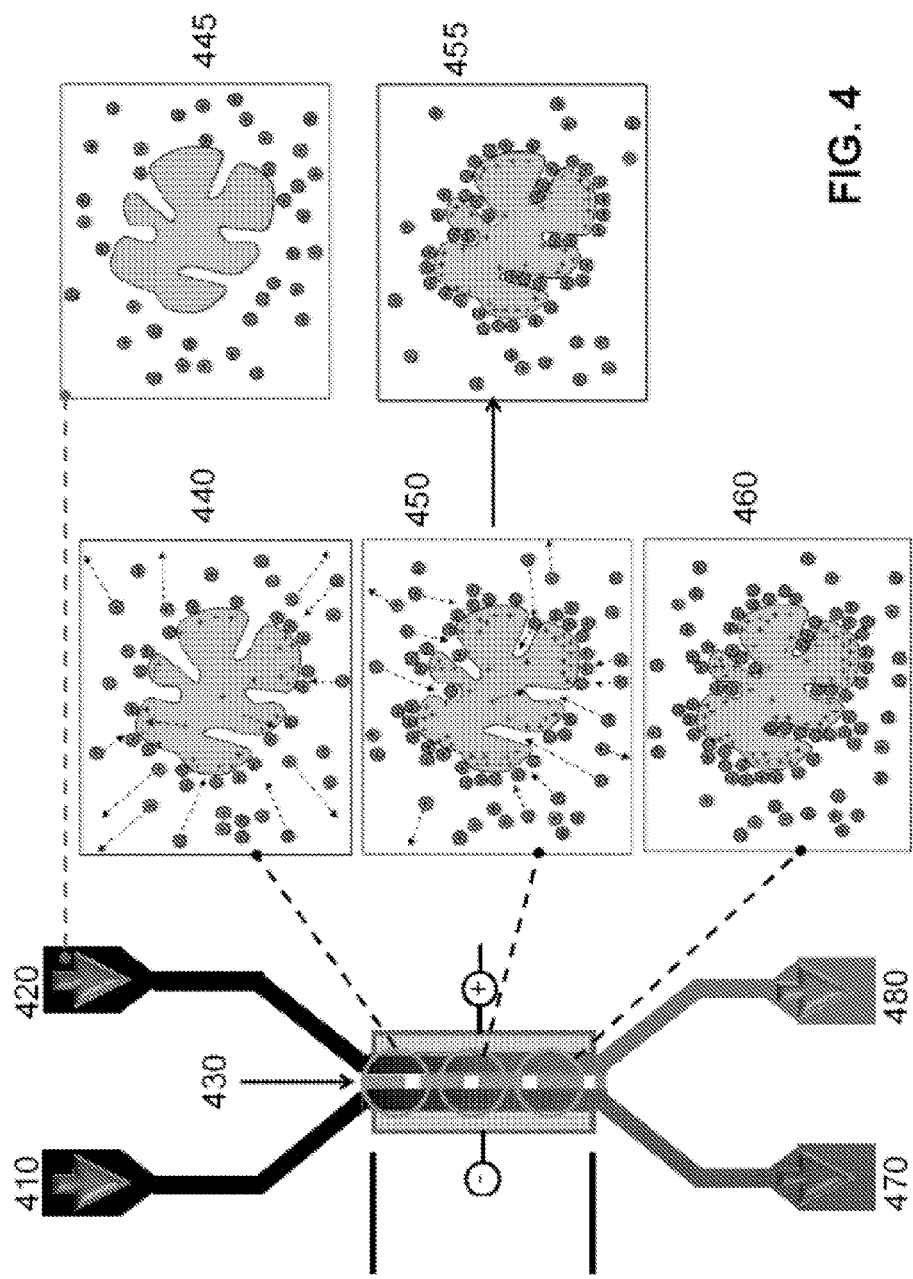
FIG. 4 is another representation of one embodiment of an energy storage device of the present invention, including reservoirs for storing uncharged and charged semi-solid compositions.

Referring to the figures, the concept of the invention is shown in FIG. 1 and FIG. 3, and an exemplary capacitive cell of an energy storage device is shown in FIG. 2 and FIG. 4.

FIG. 1 provides a macroscopic view of an embodiment wherein uncharged slurries of semisolid electrodes flow from reservoirs 110, 120, through the capacitive cell between the current collectors 140, across which potential 130 is applied, into the collection reservoirs 150, 160 which contain the charged semisolid electrodes. In various embodiments, during operation of the cell apparatus, the slurries intended for the negative electrode will both be stored and transported separately from the slurries intended for the positive electrode. The movement of each electrode composition may be independently continuous or intermittent (i.e., step-wise or plug-wise), and either co-current or counter-current with respect to one another. In some embodiments, the flowable electrode materials can be continuously renewed and replaced from storage reservoirs (e.g., FIG. 1), thus generating an energy storage system with very high energy capacity. In some embodiments, a transporting device is used to introduce flowable electrode materials into and out of the respective capacitive zones. In some embodiments, the transporting device can be a pump or any other conventional device or means for fluid transport, including gravity.

FIG. 2 shows several of the embodiments already described. In FIG. 2, particles move from their respective reservoirs 210, 220 past the ion-permeable separator in the cell and to the storage reservoirs, at flowing particle densities 230 which may differ from the particles densities within the cell(s) 250, 260, and 270 or from the particle densities in the storage reservoirs 280. In this figure, the supercapacitive electrode particles are additionally shown as separated within the cells by the optional insulative separators 290, which may serve to both electrically isolate the cell from the source and storage streams and/or to allow packing of particles within the respective segments 250, 260, and 270. Depending on the conductivity of the supercapacitive electrode material, certain embodiments provide that the devices provides that the slurry can be transported into the charging cell and concentrated (cf. 230 and 250-270), and once the charging cell is completely filled with uncharged slurry, the cell is sealed off from the slurry that is not located within the confines of the charging cell boundaries (e.g., by 290). The slurry in the charging range can then be charged galvanostatically, potentiostatically or any combination of the two (at a constant or non-constant current). Once charged, the resulting slurry or dispersion can be transported to an adjacent cell or portion of the same cell, or to a reservoir of charged carbon material, previously charged to the same (or a different) potential, in the same manner or in a different manner than the charged material being flowed into the reservoir. In such embodiments, the device can provide the ability to add or remove electrolytic solvent from the supercapacitive electrode particles within or between cells, optionally and preferably recycling that electrolytic solvent within the same cell. In this particular design consideration, the supercapacitive electrode particles must both satisfy the need to be easily dispersed and transported with the electrolytic liquid and the ability to maintain its electrochemical performance by this process of dispersion and/or re-concentration (for either charging or storing).

FIG. 3 shows a series of temporal representations as the flowable electrode materials pass through an exemplary capacitive cell of an exemplary energy storage device. In FIG. 3, the energy storage device may 330 separated by an ion permeable separator 320. Positive electrode current collector 310 and ion permeable separator 320 define an area, 315, herein after referred to as the "positive capacitive zone" that accommodates the positive flowable supercapacitive electrode particles 340a. Negative electrode current collector 330 and ion permeable separator 320 define an area, 325, herein after referred to as the "negative capacitive zone" that accommodates the negative flowable supercapacitive electrode particles 340b. In FIG. 3A, Time A represents a time wherein either the two electrode compositions (containing supercapacitive particles 340 within an electrolytic solvent containing anions and cations) have just entered the capacitive cell and/or before an electric potential has been applied across the two current collectors (310 and 330). As shown in this series of figures, each of the electrode compositions may enter their respective capacitive zone independently from the top or the bottom, though again, the orientation of these figures and the descriptions "from the top or the bottom" should not be interpreted to limit the invention to this particular orientation. In FIG. 3B, Time B represents a time during which the supercapacitive particles become charged, and the effects this charging is just beginning to affect the relative positioning of the ions in the electrolytic solutions. In FIG. 3B, the cations and anions begin to distribute themselves within their respective electrolytic solutions, and begin to migrate through the ion-permeable separator 320 to balance the charges of the supercapacitive particles. During operation, ions can move across ion permeable membrane 320. FIG. 3C reflects increasing redistribution of the electrolyte ions within the system. FIG. 4D reflects a relatively complete redistribution of the ions within the respective electrode systems. While shown here as a near spatially static representation, it should be appreciated that various embodiments provide that flowable or moveable supercapacitive compositions move relative to the capacitive cell of the device. In the example of FIG. 3, once the desired level of charge has been provided to the flowable electrodes, that particular charged portion of the fluid plug is replaced with a new uncharged fluid plug (as in FIG. 3A) and the process continues.

FIG. 4 similarly shows an embodiment wherein the uncharged particles of electrode slurries move from their respective source tanks, 410 and 420, past the ion-permeable separator 430 and into their respective receiver tanks 470 and 480. This figure provides an illustration of the distribution of electrolyte charge in the receiver tanks 445, and as the porous supercapacitive particles move through the capacitive cell, showing initial redistribution of charge at the initial exposure to the charge potential 440, and after increasing exposure of the porous particles to the charging potential 450 and 460. Not sufficiently shown in these figures is the fact that the electrolyte ions may exist within the pores of the particles even before charging. Depending on the time that the supercapacitive particles are exposed to the charging potential, the charges may not be completely redistributed by the time the particles exit the cell. Optimum storage conditions exist when this distribution is allowed to complete. For example, if the particles were to exit the cell at a time corresponding to 450, their charges would redistribute according to 455 outside the cell. In part, this is reflected in FIG. 6.

Other embodiments provide for a double or multiple cell-stack, closed-loop system enabling charging of uncharged and discharging of previously charged slurry at the same time. This feature may be of particular importance to simultaneously respond to fast fluctuations in energy production and energy consumption, which are two inherently independent parameters. In such embodiments, each half-cell can use a flow field or channel to direct the flow of active material over the surface of a polarized current collector. A porous separator is then used to electrically insulate opposing half-cells while permitting the exchange of ions.

Figure 9:
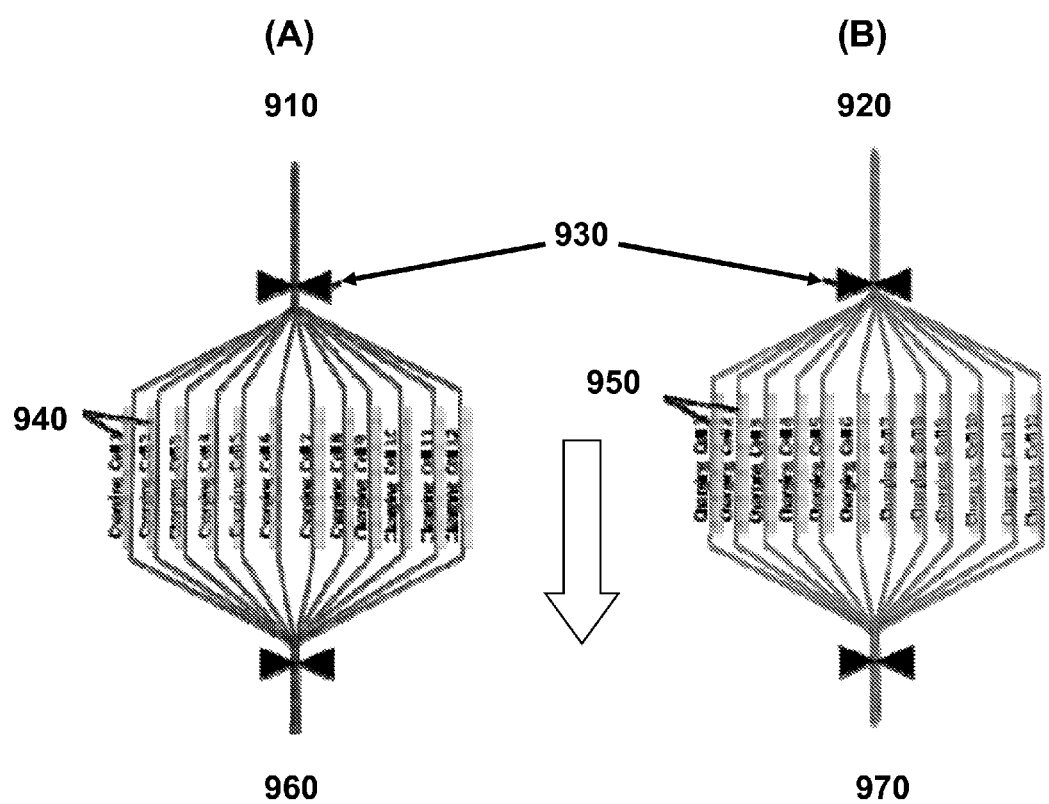

FIG. 9 illustrates an embodiment wherein the streams exiting the source tanks 910 and 920 are split into multiple streams by control valves 930, which are directed into parallel charging cells 950. In this figure, once the individual streams are charged, the streams of positively charged particles are combined into a single stream for storage in a common storage vessel (e.g., 960) as are the negatively charged particles (e.g., 970). In variations on this theme, separate embodiments allow the user to individually control the flow rates and charging conditions for the various streams. While FIG. 9A and FIG. 9B are drawn separately for the clarity of the viewer, it is intended in this embodiment that the two Figures overlap, such that each stream shares corresponding semi-permeable separator and set of collectors; e.g., charging cell 1 of A marries with charging cell 1 of B.

Figure 10:
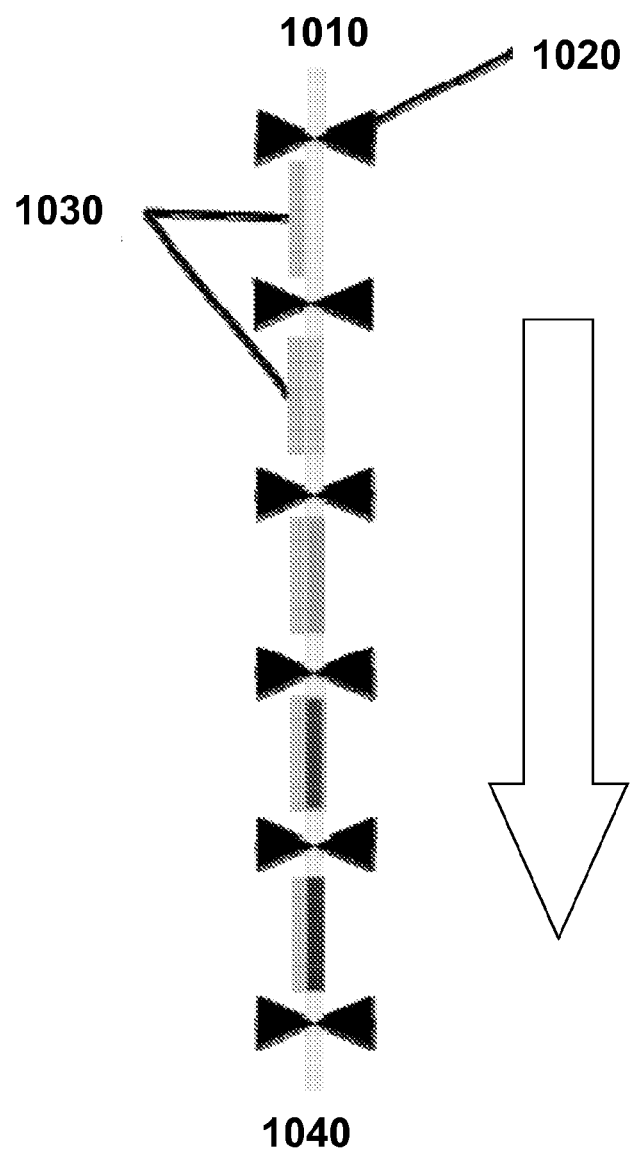
FIG. 10 illustrates an embodiment of serially positioned charged capacitive cells

FIG. 10 illustrates another embodiment comprising a series of capacitive cells 1030, separated by individual control valves 1020, wherein slurried electrode materials move from source tanks 1010 to receiver tanks 1040. Related embodiments provide options including controlling the flow of materials from the source reservoirs to the cell(s), from one cell to another, and/or from the cell(s) to the receiving reservoir, and/or operating each cell 1030 at differing potentials for differing times, so as to ensure proper charging of the supercapacitive particles.

Beyond the individual energy storage devices, this invention includes those embodiments in which at least one such energy storage device is incorporated into transportation systems, including automobiles (for example, for use in plug-in hybrids or all-electric vehicles), individual private dwellings or residences, and into power generation and/or grid systems, particularly those where the generation of power is non-constant—e.g., wind turbine or water wave systems or solar farms.

EXAMPLES

The following Examples, while non-limiting as to the scope of the present invention(s), are considered individual embodiments thereof.

Experimental Series 1: Section 1: Experimental Parameters

The tests described herein were completed on a static configuration of the charging cell with a well/reservoir to demonstrate the concept of using slurries or dispersions as supercapacitive energy storage media. In these experiments, all configurations symmetrical/identical half cells were used. The half-cell design used 99.9% pure gold current collectors, with 15 mm×15 mm chambers having 0.5 mm deep side walls, yielding a total volume of 0.1125 cm$^{-3}$ (i.e., 1.5 cm×1.5 cm×0.05 cm). Each reservoir was filled with slurry/paste in entirety. In all cases, 2 PVDF separators (Millipore Durapore polyvinylidene fluoride (PVDF) Membrane Filter 0.1 micrometer pore size, 0.125 mm thick; Cat. No. VVLP04700)) were used.

Activated Carbon:

For experiments using activated carbon, the activated carbon was vacuum dried at 150° C. for 48 hours prior to use and the measured weight was based on values taken after vacuum drying. Activated carbons used included (1) Kuraray YP-17 (YP-50F) with the following properties: particle diameter 3-20 micron, ash content 1.0 max, total surface area 1600-1700 m$^2$/g, Iodine Absorption 1700-1800, Benzene adsorption 45-55 and pH 5-8; (2) Mast Carbon Ltd. Activated carbon beads 250-500 micron individual particle size. The carbon beads are derived via pyrolysis of a phenolic resin. The beads have a surface area of 1100 m$^2$/gram.

Paste Preparation:

Kuraray YP-17 (YP-50F) activated carbon was placed in a vacuum oven at 150° C. for 24 hours at which time the carbon powder was backfilled with air the process was repeated once and the activated carbon was removed from the oven giving 5.0 g of activated carbon powder. To the powder was added 0.25 g of carbon black acetylene (prepared by vacuum oven in a similar way). To the mixed carbon powders was added 11.7 grams of 1M sodium sulfate aqueous solution prepared from deionized water. The whole was mixed with a spatula giving a viscous paste the paste was then subjected to sonication for 30 minutes. The resulting paste was allowed to remain unused for at least 24 hours after sonication.

A paste with YP-17 (YP-50F) excluding carbon black was also prepared in a similar manner at a similar carbon concentration of about 31% carbon in 1M sodium sulfate aqueous.

For slurries of the Mast Carbon beads (250-500 micron) the slurries were prepared in the same manner but at a lower concentration. Mast Carbon Beads were used 50 mg per half cell (Half Cell Volume 0.1125 cc) in 1M sodium sulfate, corresponding to about 17 wt % solids.

Experimental Series 1, Section 2. Measurement Procedures and Parameters

Charging Cell prepared as follows: The electrode slurries with either YP-17(YP-50F) or both YP-17(YP-50F) with 5% carbon black was placed in the half cell on gold current collector with the aid of a spatula such that the reservoir was filled completely but not above the wall level. The Mast Carbon bead slurry was loaded on the half cells by pipetting the slurry onto/into the reservoir without any other manipulation. Each supercapacitor half cell was then fused together with a separate Durapore membrane where the two half cells with their separators were sandwiched together forming a capacitor cell. The Durapore membrane had 0.1 micron pores and was previously soaked in brine for 30 minutes or until the membrane had completely been saturated by the brine as judged by its transition from a white opaque appearance to a translucent appearance. All measurements and manipulations were completed in conditions where the assembled supercapacitor was submerged in a 1M sodium sulfate aqueous solution. The resulting configuration was then sealed with a plastic bag sealer where the tabs of the current collectors were exposed.

Sodium Sulfate was purchased from Fischer Chemical (CAS: 7647-14-5). Carbon Black Acetylene 100% compressed 99.9% metal basis 80 m$^2$/g was purchased from Alfa Aesar (Stock No. 29723). Only deionized water was used for all experiments.

Cyclic Voltammograms:

Open circuit voltage, galvanostatic cycling and potential at zero charge measurements were completed with a Biologic potentiostat (Model VMP3) controlled with software version 10.2.

Specific Capacitance ($C_{sp}$) Calculation:

The specific capacitance (F/g) of the carbon in the respective slurries was calculated using the cyclic voltammograms by taking the integral of the current for the entire voltage window during the sweep from the highest voltage point to the lowest voltage point. In that way an average $$C_{sp}=4(I/((dV/dt)\times{}^*mass).$$

For cyclic voltammograms dV/dt (the scan rate) was fixed and I (current) varied within the Potential range. Thus, capacitance was calculated for the entire potential window of the sweep from 0.6 to –0.4 V (For Mast Carbon Beads) or from 0.8 to –0.2 (For YP-17 activated carbon). Thus capacitance calculated can be more or less as the average capacitance for the potential range. The mass in all cases was the combined carbon mass (dry weight) of the anode and cathode.

For the galvanostatic series I (current) is fixed and dV/dt is taken as an average, the slope (dV/dt) of the discharge period from (0.95 to 0 V). The range of 1.0V to 0.95 V during the discharge is excluded because of the sudden drop in potential observed in galvanostatic discharge due to charge and ion redistribution effects.

Potential Obtained from the Galvanostatic Series:

The potentials obtained from the galvanostatic series were all taken at the end of the respective open circuit voltage periods. In all cases galvanostatic charging and discharging were completed at the same rates at approximately 100+10 milliamperes per gram of carbon material (combined dry carbon mass of anode and cathode) All materials charged to 1.0V galvanostatically and held at 1.0V potentiostatically for 3 minutes. At the end of the 3 minute potentiostatic hold at 1.0V the open circuit voltage (OCV) period began. Discharge was completed at same current as when charging and then held at 0V potentiostatically for 5 minutes followed by a 5 minute OCV period before the start of the next charging cycle in the series. (8 charging/discharging cycles at OCV periods of 0 min, 5 min, 15 min, 30 min, 1 hour, 2 hours, 4 hours and 8 hours make up one galvanostatic sequence).

Experimental Series 1, Section 3: CV Results

FIG. 6 shows capacitance as a function of the area enclosed between the charge and discharge line of the CV curve. While the capacitance of the proof-of-concept stage set-up is still unoptimized, at specific capacitances of 97.4 F/g (Kuraray YP-17 with 5% Carbon Black), 79.6 F/g (Kuraray YP-17 no Carbon Black) and 45.8 (F/g) (Mast Carbon Beads 250-500 micron range) (at 5 mV/sec normalized to the solid part of the slurry), it is clearly evident that energy storage and harvesting from electrochemical flow capacitors is possible, reproducible, and stable.

Figure 6A:
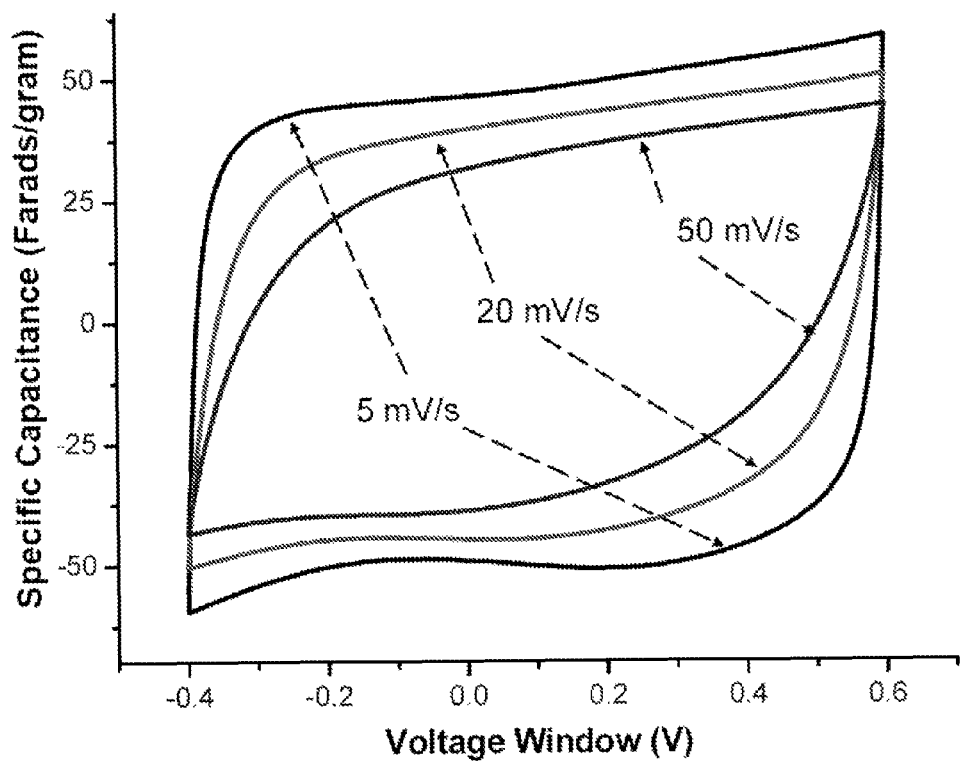
FIGS. 6A-C shows several cyclic voltammograms obtained at various scan rates for several dispersions described in the Examples.

FIG. 6A shows cyclic voltammograms (CV) at (5, 20 and 50 mV/s) scan rates for a Mast Carbon sample 250-500 micron beads (individual particle size) in 1M sodium sulfate ($Na_2SO_4$) (50 mg per half-cell in 1M aqueous sodium sulfate). The specific capacitances for the 5, and 50 mV/s scan rates were 45.8, 37.6, and 25.4 F/g, respectively. The differences in capacitance as a function of scan rate reflect the ability of each system to respond to the latter.

Figure 6B:
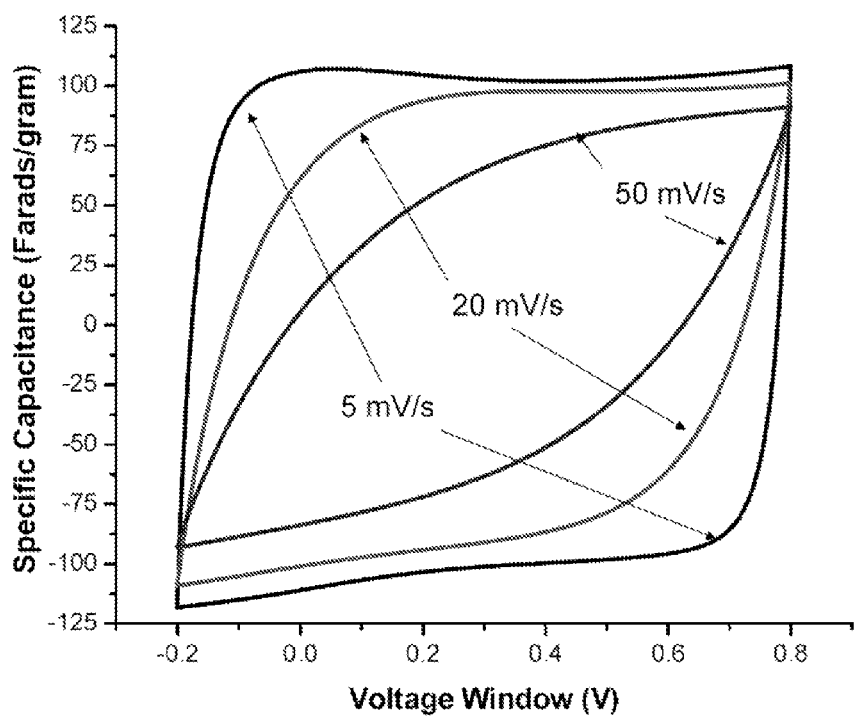
Figure 6C:
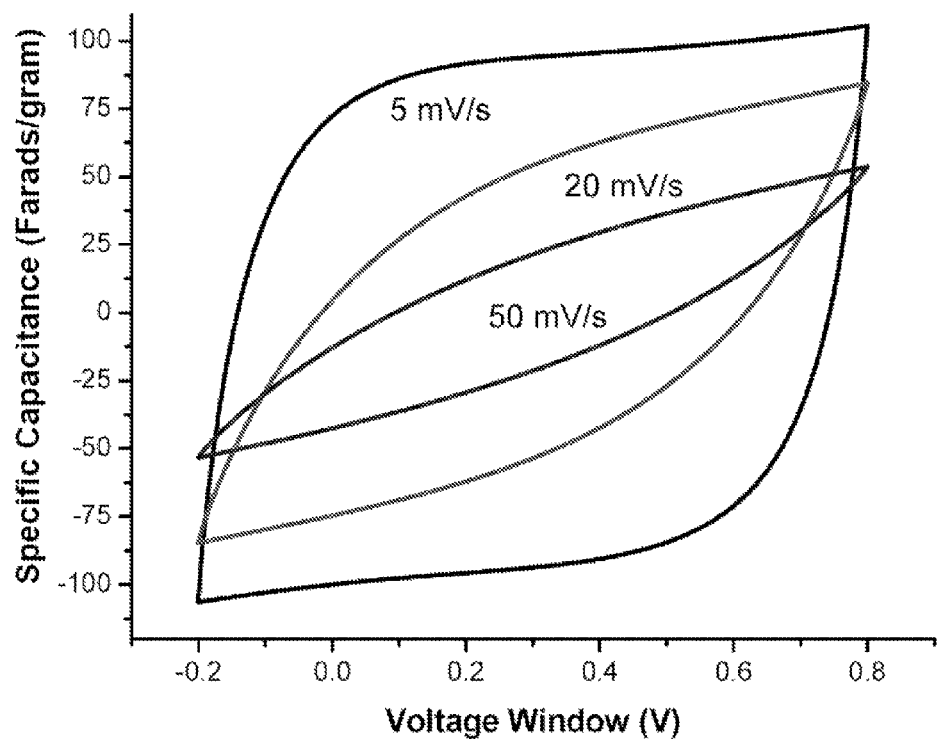

FIG. 6B shows cyclic voltammograms at (5, 20 and 50 mV/s) scan rates for a Kuraray YP-17 (YP-50F) sample with 5% by weight Carbon Black (total carbon 31% by weight in 1M aqueous sodium sulfate). The specific capacitances for the 5, 20 and 50 mV/s scan rates were 97.4, 75.2, and 45 F/g, respectively FIG. 6C shows cyclic voltammograms at (5, 20 and 50 mV/s) scan rates for a Kuraray YP-17 (YP-50F) (total carbon as 31% by weight in 1M aqueous sodium sulfate). The specific capacitances for the 5, 20 and 50 mV/s scan rates were 79.6, 35.6, and 20.8 F/g, respectively As shown in FIG. 6, the capacitance is a function of the area enclosed between the charge and discharge line of the CV curve. While the capacitance of the proof-of-concept stage setup is still rather small at 17 F/g (normalized to the solid part of the slurry), it is clearly evident that energy storage and harvesting from electrochemical flow capacitors is possible, reproducible, and stable.

Experimental Series 1, Section 4. Ability to Hold Charge

Figure 7:
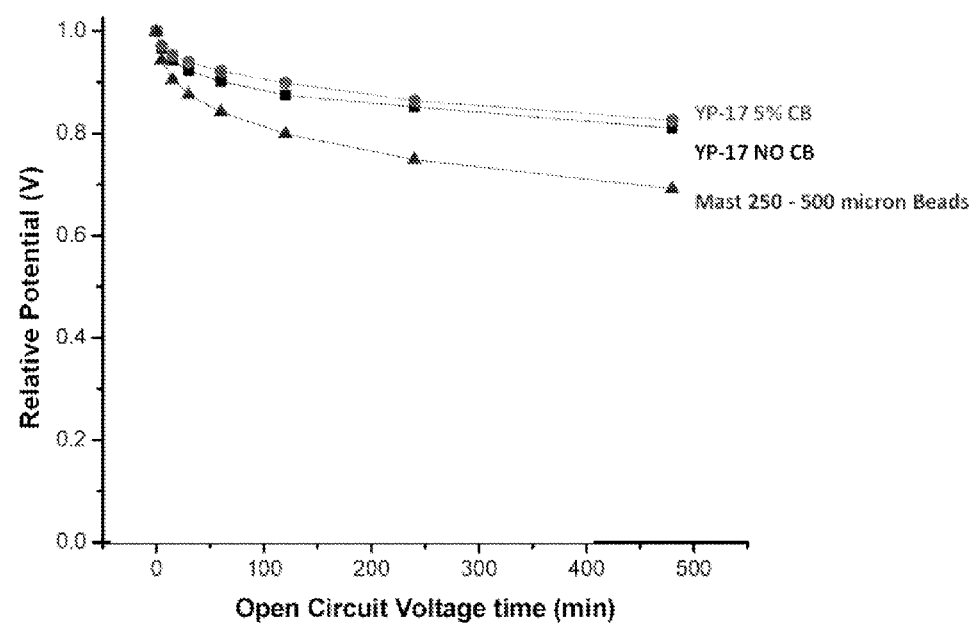
FIG. 7 illustrates the loss of voltage as a function of time for a prototype system of the present invention.

FIG. 7 illustrates the loss of voltage as a function of time for a prototype system of the present invention using several materials. The potentials obtained from the galvanostatic series were all taken at the end of the respective open circuit voltage periods. In all cases galvanostatic charging and discharging were completed at the same rates at approximately 100+/−10 milliamperes per gram of carbon material (combined dry carbon mass of anode and cathode). All materials were charged to 1.0V galvanostatically and held at 1.0V potentiostatically for 3 minutes. At the end of the 3 minute potentiostatic hold at 1.0V the open circuit voltage (OCV) period began. Discharge was completed at same current as when charging and then held at 0V potentiostatically for 5 minutes followed by a 5 minute OCV period before the start of the next charging cycle in the series. (8 charging/discharging cycles at OCV periods of 0 min, 5 min, 15 min, 30 min, 1 hour, 2 hours, 4 hours and 8 hours make up one galvanostatic sequence).

After several hours, most of the initial potential remained. After 490 minutes, the systems using YP-17 (with 5% carbon black), YP-17 (without carbon black), and Mast 250-500 micron beads showed residual potentials of 0.81, 0.83, and 0.69 V, respectively (corresponding to losses of 0.19, 0.17, and 0.31 V, respectively). While the losses were on the order of 20-30% for this prototype system, the losses did asymptote to relatively constant values.

Experimental Series 1, Section 5: Capacitance vs. Discharge Current Density

Figure 8:
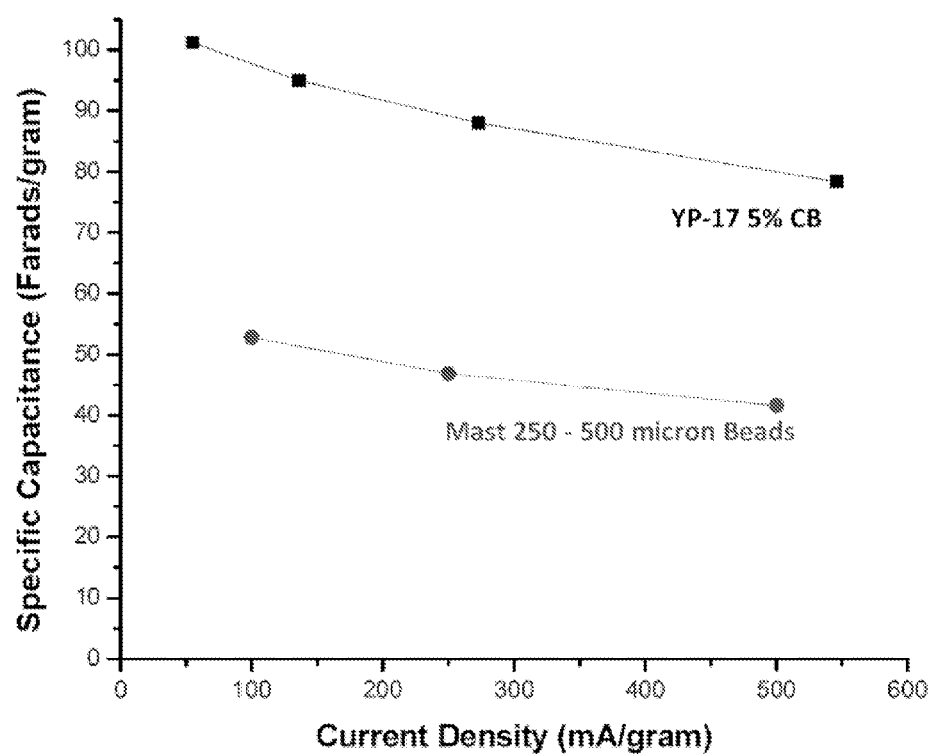
FIG. 8 illustrates the relationship between specific capacitance and current density using two types of carbon electrode materials for a prototype system of the present invention.

FIG. 8 illustrates the relationship between specific capacitance (F/g) and current density in milliamperes per gram (mA/g). More specific data are presented in the Table below. When, as shown here, the capacitance decreases with increasing current density, the use of multiple discharge channels can be used for achieving large currents. The invention can be used for high and low current densities.

| TP-17 (5% carbon black) | | Mast 250-500 micron beads | |
|---|---|---|---|
| Galvanostatic current, mA/gram C | Specific capacitance, F/g | Galvanostatic current, mA/gram C | Specific capacitance, F/g |
| 55 | 101.2 | 100 | 528 |
| 135 | 95.0 | 250 | 46.8 |
| 273 | 88.0 | 500 | 41.6 |
| 545 | 78.4 | | |

Experimental Series 2: Section 1: Experimental Parameters
Materials.

Figure 11:
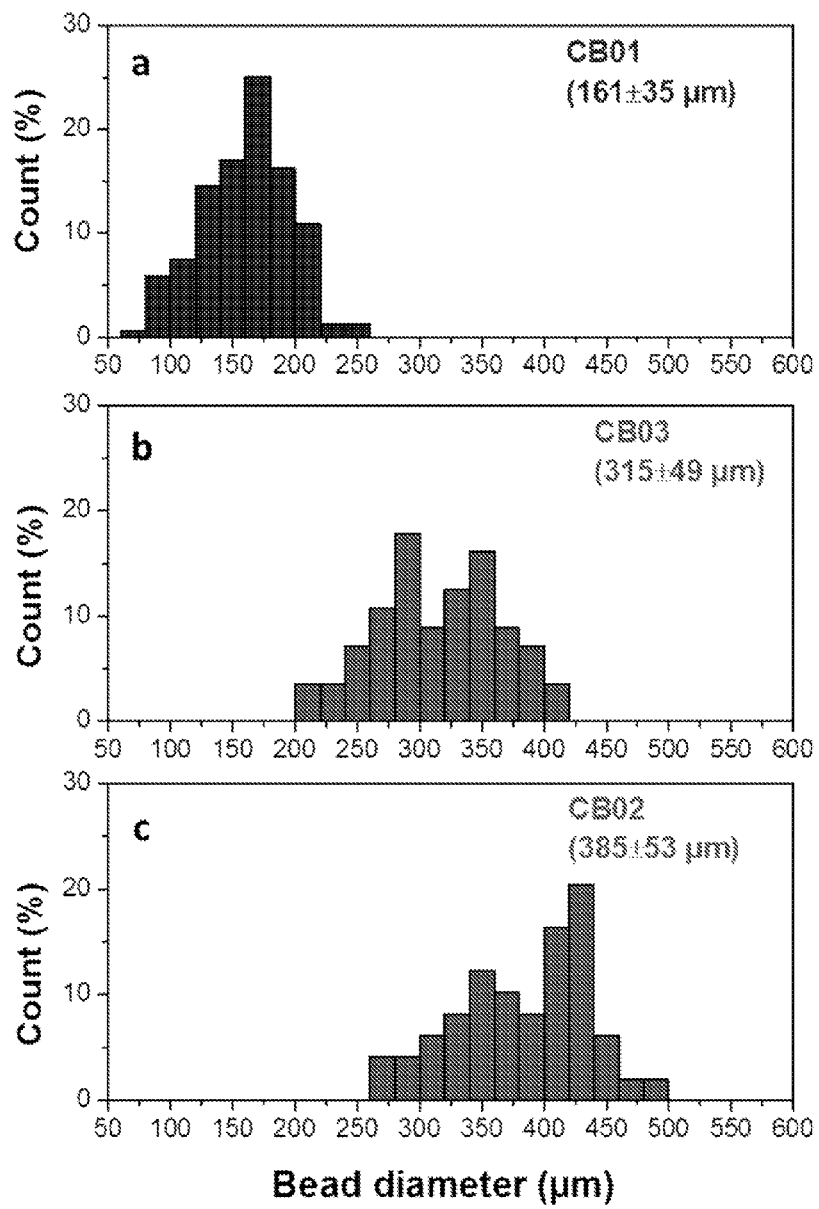
FIG. 11 shows particle size distributions of materials used in Experimental Series 2, below, including the carbon beads MAST 125-250 (FIG. 11($a$)), Antoxineer (FIG. 11($b$)), and MAST 250-500 (FIG. 11($c$)). The values in parentheses indicate the average bead diameter and the standard deviation (based on 150 measurements per histogram).
Figure 12:
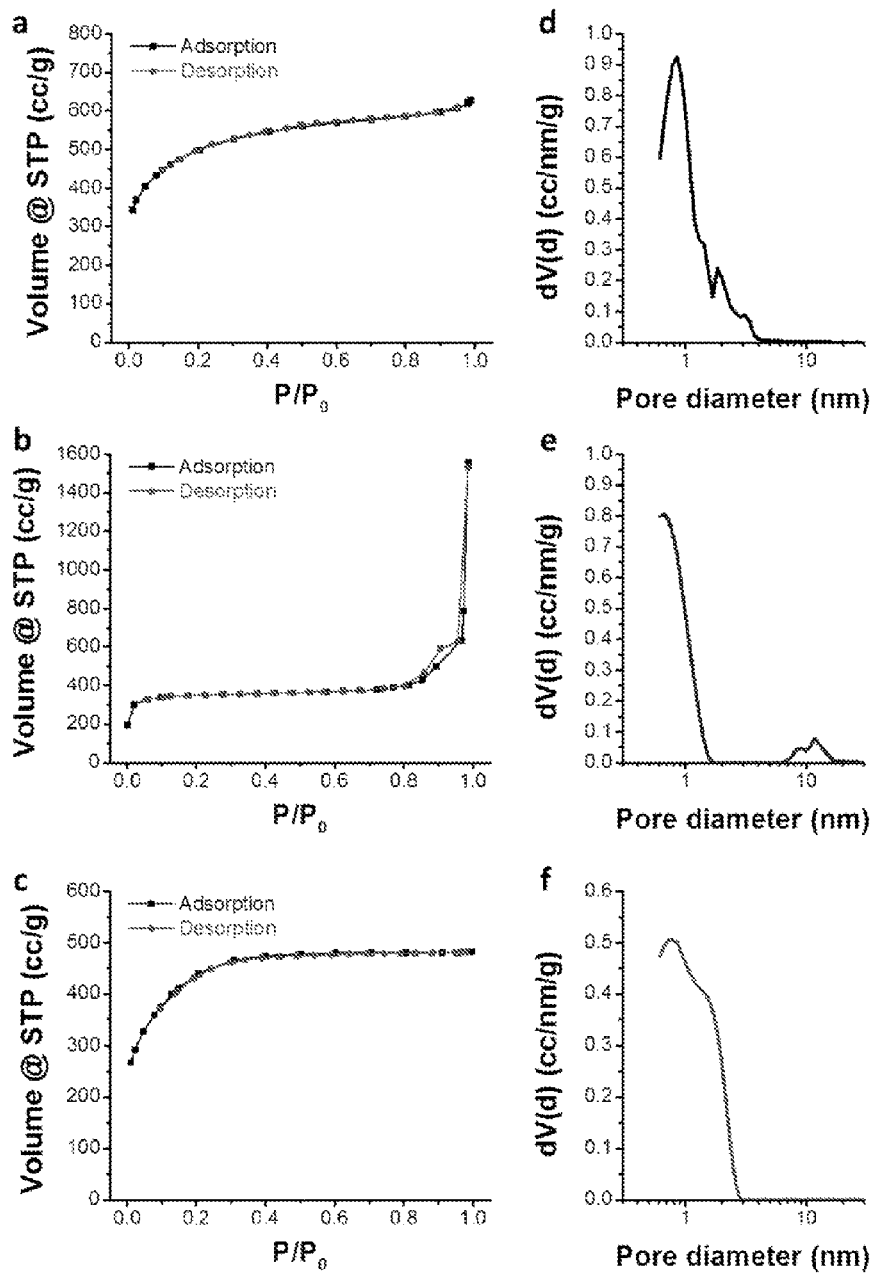
FIG. 12 shows nitrogen sorption isotherms at −196° C.

Carbon beads (referred to as CB) derived from phenolic resin were obtained from MAST carbon (United Kingdom) and Antoxineer (People's Republic of China). MAST 125-250 (CB01; average particle size: 161±35 μm) and MAST 250-500 (CB02; average particle size: 385±53 μm) carbon beads had an average volume-weighted pore size of 8.6 nm and a BET surface area of 1341 $m^2/g$. Antoxineer spherical active carbon granules (CB03) had an average particle size of 315±49 μm with an average volume-weighted pore size of 1.2 nm, and a BET surface area of 1569 $m^2/g$. TiC-CDC was obtained from dry chlorination of TiC with a particle size of 2 μm from Alfa Aesar (Stock #40178) at 1000° C. for 6 hours, with subsequent annealing in hydrogen at 600° C. for 3 hours. The particle size remained unchanged after chlorination. The volume weighed average pore size was 1.1 nm and the BET surface area 1815 $m^2/g$. See FIG. 11 and FIG. 12 and TABLE 1, below.

Nitrogen gas sorption was carried out in a Quadrasorb gas sorption instrument (Quantachrome, USA). The average, volume-weighted pore size was derived from the cumulative pore volume assuming slit-shaped pores and using the quenched-solid density functional theory (QSDFT) algorithm. See FIG. 12 and Table 1.

Sample Preparation: Carbon Slurry Composition.

Figure 12G:
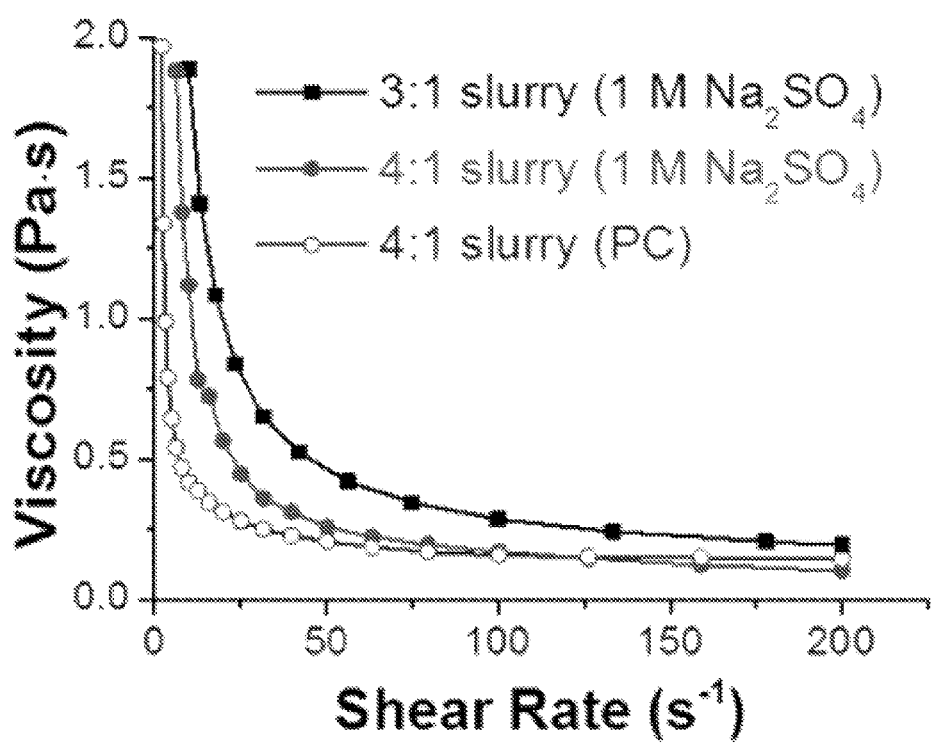

The composition of the carbon slurry determines its rheological and electrochemical properties. In particular, as described above, the concentration of carbon particles, particle size/shape, and carrier-fluid (electrolyte) viscosity have a significant effect on the performance of the carbon slurry, and can be altered to obtain improvements in rheological and electrochemical properties for enhanced flow and performance. In this study, carbon slurries based on spherical porous carbons with a high surface area were tested. In a suspension, spherical carbon beads with a narrow particle size distribution provide rheological advantages, minimizing the flow-induced particle size segregation and clogging such that a smooth flow pattern can be achieved. Considering this advantage, phenolic-resin-derived activated carbon beads with average particle sizes of 161 μm (CB01), 315 μm (CB03), and 383 μm (CB02) and carbide-derived carbon powder obtained from a titanium carbide precursor (TiC-CDC; average particle size ca. 2 μm) were tested. Slurries were prepared by mixing the carbon beads or CDC with carbon black (100% compressed; Alfa Aesar, USA) in ethanol to achieve a 9:1 weight ratio. The carbon black was used as a conductive additive. An appropriate amount of electrolyte (either 1M $Na_2SO_4$ (aq) or 1.25M $TEA-BF_4$ in propylene carbonate) was added to achieve the desired electrolyte-carbon ratio. The ethanol was removed via evaporation prior to testing. Microparticulate TiC-CDC was analyzed to enable comparison of the tested slurries against a material with a high intrinsic capacitance. X-ray microtomography showed that for a 3:1 mixture (electrolyte:carbon by mass) of CB01 resting in a 1 mm capillary, most carbon beads were in direct physical contact, creating a conductive 3D-network (i.e., high bead connectivity) that enabled electron transport within the active material. By increasing the electrolyte mass ratio from 3:1 to 4:1, the slurry was observed to exhibit improved macroscopic flowability with honey-like characteristic. Rheological analyses indicated that with increased shear rate, a continuous decrease in the viscosity of the slurry occurred (i.e., shear-thinning) and a change in the flow characteristics of the slurry was observed (FIG. 12(g)).

TABLE 1

Overview of material characterization parameters of the studied carbon materials (specific area, SSA; pore volume, $V_{Pore}$; average pore diameter, $\varnothing_{Pore}$; and average particle size, $\varnothing_{Particle}$).

| Material | BET SSA[#] ($m^2/g$) | DFT SSA[‡] ($m^2/g$) | $V_{Pore}$ ($cm^3/g$) | $\varnothing_{Pore}$ (nm)[*] | $\varnothing_{Particle}$ ($\mu m$)[+] |
|---|---|---|---|---|---|
| TiC-CDC-1000 | 1815 | 1777 | 0.88 | 1.1 | 2 ± 1 |
| CB01 | 1341 | 1360 | 1.08 | 8.6[§] | 161 ± 35 |
| CB02 | 1341 | 1360 | 1.08 | 8.6[§] | 385 ± 53 |
| CB03 | 1569 | 1300 | 0.69 | 1.2 | 315 ± 49 |

[#]BET SSA was derived from the Brunauer-Emmett-Teller equation (see Brunauer, S., Emmett, P. H. & Teller, E. Adsorption of Gases in Multimolecular Layers. *Journal of the American Chemical Society* 60, 309-319 (1938) for values of the relative pressure between 0.05 and 0.30 $P/P_0$ (see International Standard ISO/DIS 9277 Determination of the specific surface area of solids by gas adsorption - BET method (2008)). Each reference is incorporated by reference herein in its entirety for their respective teaching).
[‡]DFT SSA was obtained from quenched-solid density functional theory (QSDFT) deconvolution of $N_2$-sorption isotherms (−196° C.) assuming slit pores, as described in Ravikovitch, P. I. & Neimark, A. V. Density Functional Theory Model of Adsorption on Amorphous and Microporous Silica Materials. *Langmuir* 22, 11171-11179 (2006), which is incorporated by reference in its entirety herein
[*]The average pore size was calculated as the volume-weighted average, that is, 50% of the total pore volume is associated with pores smaller/larger than this value
[+]The average particle diameter for the carbon beads was derived from optical microscopy and for TiC-CDC-1000 as provided from the manufacturer of the TiC powder (TiC-CDC is conformal to the carbide precursor).
[§]The large volume-weighted average pore size of the MAST carbon spheres resulted from the bimodal pore size distribution with a first peak at ~0.65 nm and a second one at 10 nm. The SSA-weighted average pore diameter, for comparison, would be only 0.73 nm.

Cell Design.

The design of the flow capacitor cell is important to facilitate the flow of the capacitive slurry (i.e., mitigate the potential for clogging) and maximize system performance. In particular, the performance of the flow cell design depended on the properties of the slurry used for capacitive storage. Several designs were considered, tested, and evaluated before selecting the cell design used herein (FIG. 13(b)). The chosen cell design provided the high level of flow control required for prototype benchmarking and also enabled testing of operation modes similar to the ones which are anticipated to be encountered for a full-scale electrochemical flow capacitor device. In the selected design, a single flow channel with a depth of 1.6 mm ran through each half-cell. Half-cells consisted of a stainless steel current collector recessed in a polytetrafluoroethylene (PTFE) flow manifold. Polymer membranes typically used in supercapacitors and batteries were used as the isolative separator between the two half-cells. Valves with a cross-sectional diameter similar to the flow channel were installed at the inlet and outlet of the cell to minimize the clogging and provide physical/electrical confinement of the slurry within the cell.

Experimental Series 2, Section 2. Measurement Procedures and Parameters

Instrumentation.

A Zeiss Supra 50VP scanning electron microscope (Carl Zeiss AG, Germany) operating at 3 kV was used for electron microscopy. A Skyscan 1172 (Skyscan US Inc., USA) was used for X-ray microtomography (voxel resolution: 1.92 μm). Viscosity was measured using a TA Instruments (USA) AR rheometer in a rotational concentric cylinder geometry at room temperature.

Electrochemical Measurements.

All measurements were carried out at ambient temperature with a VMP3 or SP150 potentiostat/galvanostat (BioLogic, France). Experiments in aqueous electrolyte were conducted in air and the organic electrolyte testing was carried out in an argon-filled glove box.

Cyclic voltammetry was carried out at 2, 5, 10, 20, 50, and 100 mV/s scan rates for a voltage window of 0.60 and 0.75 V (aqueous), and 2.7 V (PC). From cyclic voltammetry, the capacitance is derived using the equation (1):

$$C_{sp} = \frac{\frac{2}{\Delta E} \cdot \int \frac{i d V}{v}}{m}, \quad (1)$$

where ΔE is the voltage window, i is the discharge current, V is the voltage, v is the scan rate, and m is the mass of carbon in one electrode. The factor of 2 accounts for the two electrode setup, where the charge is evenly distributed between two capacitors in series[28]. We note that the y-axis (F/g) in FIG. 4a-b was calculated by dividing twice the measured current by the scan rate and normalizing it by the weight of one electrode (corresponding to m, as defined above).

Galvanostatic charge/discharge was conducted at 30 mA for 0.6V (aqueous) and 2.7 V (organic) windows, with charge times of 120 s. The series resistance was calculated from the ohmic drop observed at the start of the discharge cycle, and the capacitance was derived from the slope of the discharge curves. All values for the capacitance were normalized by the weight of the carbon material, not the total slurry mass, to enable a direct comparison with conventional supercapacitor electrodes (which are also normalized to the content of active material). The specific capacitance $C_{sp}$ was calculated from galvanostatic cycling using equation (2):

$$C_{sp} = \frac{2i}{m \cdot \left(\frac{dV}{dt}\right)}, \quad (2)$$

where dV/dt is the slope of the discharge curve.

Equilibrium capacitance was extracted from chronoamperometry (the methods used in chronoamperometry is described in D. Brogioli, R. Zhao, P. M. Biesheuvel, *Energy Environ. Sci.* 2011, 4, 772, which is incorporated by reference in its entirety for this teaching). After a 30 min discharge period (at 0 V), the cell was charged to a certain cell potential (e.g., 2.7 V) for 5 min and then discharged to 0 V for 5 min (see, e.g., FIG. 14(f) and FIG. 15). While the current that was measured during charging was superimposed by the leakage current of the system, integration of the discharge curve directly yields the charge of the two-electrode setup. The capacitance was extracted from the discharge curves via (equation 3)

$$C_{sp} = \frac{\frac{2}{\Delta E} \cdot \int i dt}{m}. \quad (3)$$

Figure 13A:
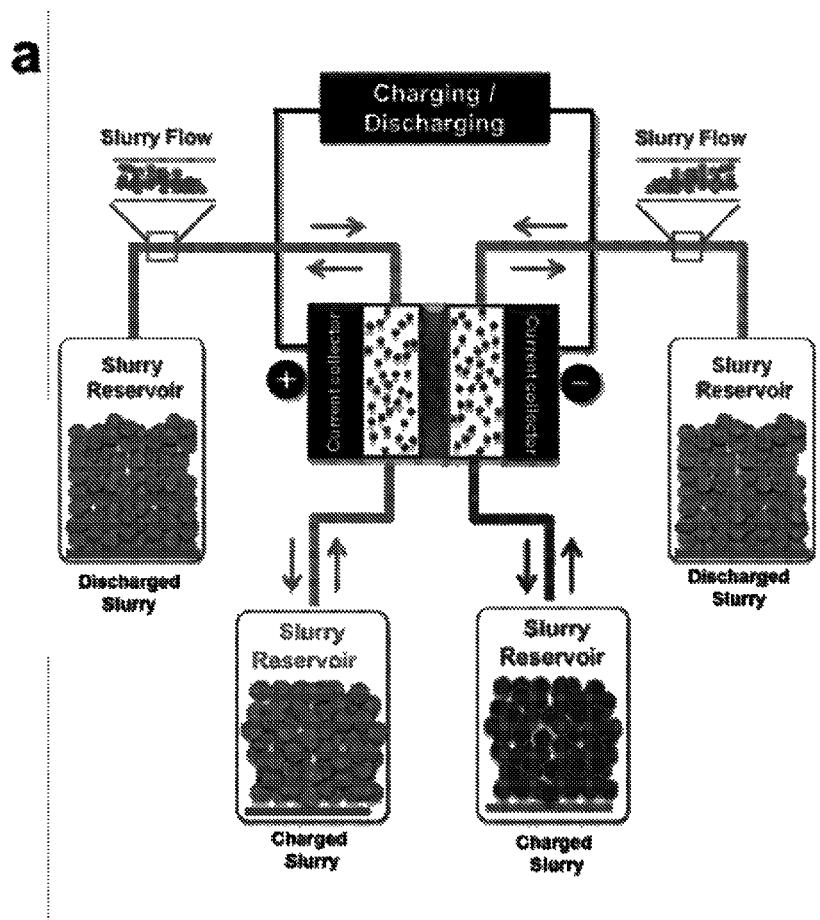
FIG. 13 shows a schematic of a simple single-cell electrochemical flow capacitor, similar to the setup used in Experimental Series 2, below.
FIG. 13(b) shows the prototype used in Experimental Series 2, which allowed intermittent flow of a carbon slurry inside an electrochemical cell for charging/discharging.
Figure 13B:
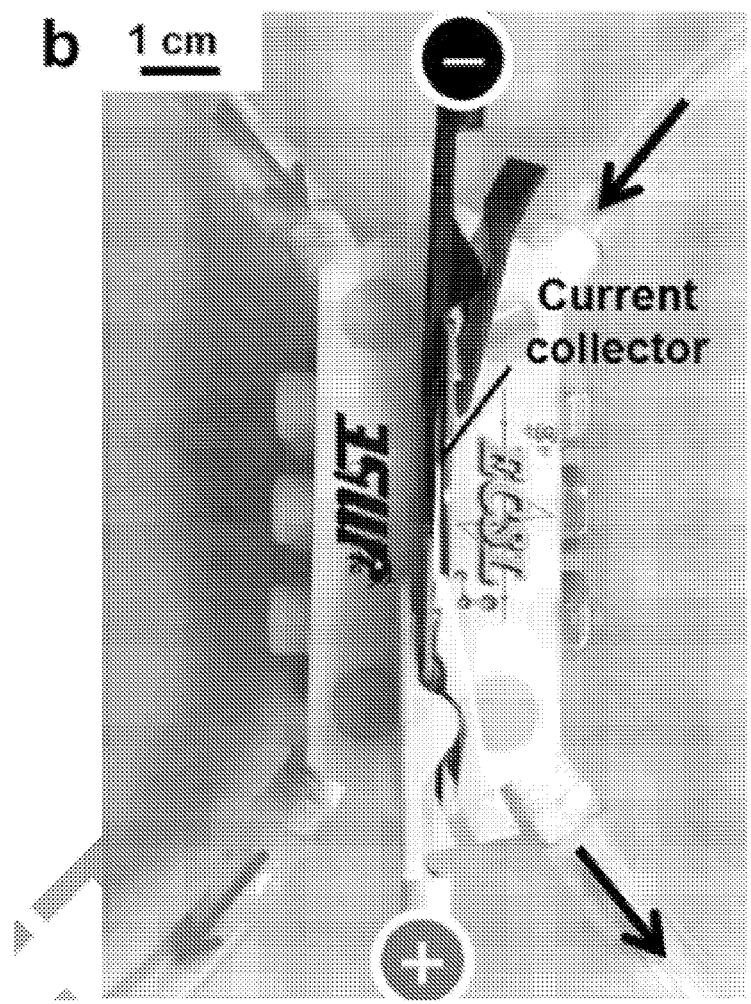

The electrochemical flow capacitor prototype (FIG. 13(b)) consisted of two stainless steel current collectors recessed in PTFE flow manifolds. 6 mm diameter throughputs allowed slurry to flow into and out of the charge/discharge cell with a 38×6 mm² active area (per half-cell). Two 1600 μm thick PTFE gaskets provided lateral confinement of the slurry and a polyvinylidene fluoride (PVDF) membrane with a mesh width of 100 nm (Durapore; Merck Millipore, Germany) served as a separator. Six nylon screws along the length of the cell ensured sealing of the enclosed carbon slurry during charge/discharge and flow operations.

Prior to intermittent-flow testing, slurry was pumped into the electrochemical flow capacitor prototype via syringe. The cell then underwent 20 cyclic voltammetry cycles from 0-0.75 V at 10 mV/s to precondition the slurry and to ensure that the internal pore-space was ion-accessible. The cell was then held potentiostatically at 0 V to dissipate any remaining charge, then charged potentiostatically at 0.75 V for 20 minutes. At the end of the charging period, the charged slurry was withdrawn from the cell using a syringe. The slurry was then returned to the cell and discharged potentiostatically at 0 V for 20 minutes. The resulting chronoamperometric profile was then analyzed to determine the voltage and coulombic efficiencies of the system. Voltage efficiency ($\varepsilon_V$) was calculated using the following equation:

$$\varepsilon_V = \frac{V_{discharge}^{max}}{V_{charge}^{min}} \cdot 100\%. \quad (4)$$

The coulombic efficiency ($\varepsilon_C$; also referred to as Faradaic or current efficiency) was determined according to equation (5) and corrected for leakage current $$\varepsilon_C = \left| \frac{\int I_{discharge} dt}{\int I_{charge} dt} \right| \cdot 100\%. \quad (5)$$

Experimental Series 2, Section 3: Electrochemical Flow Capacitor Performance

Figure 14:
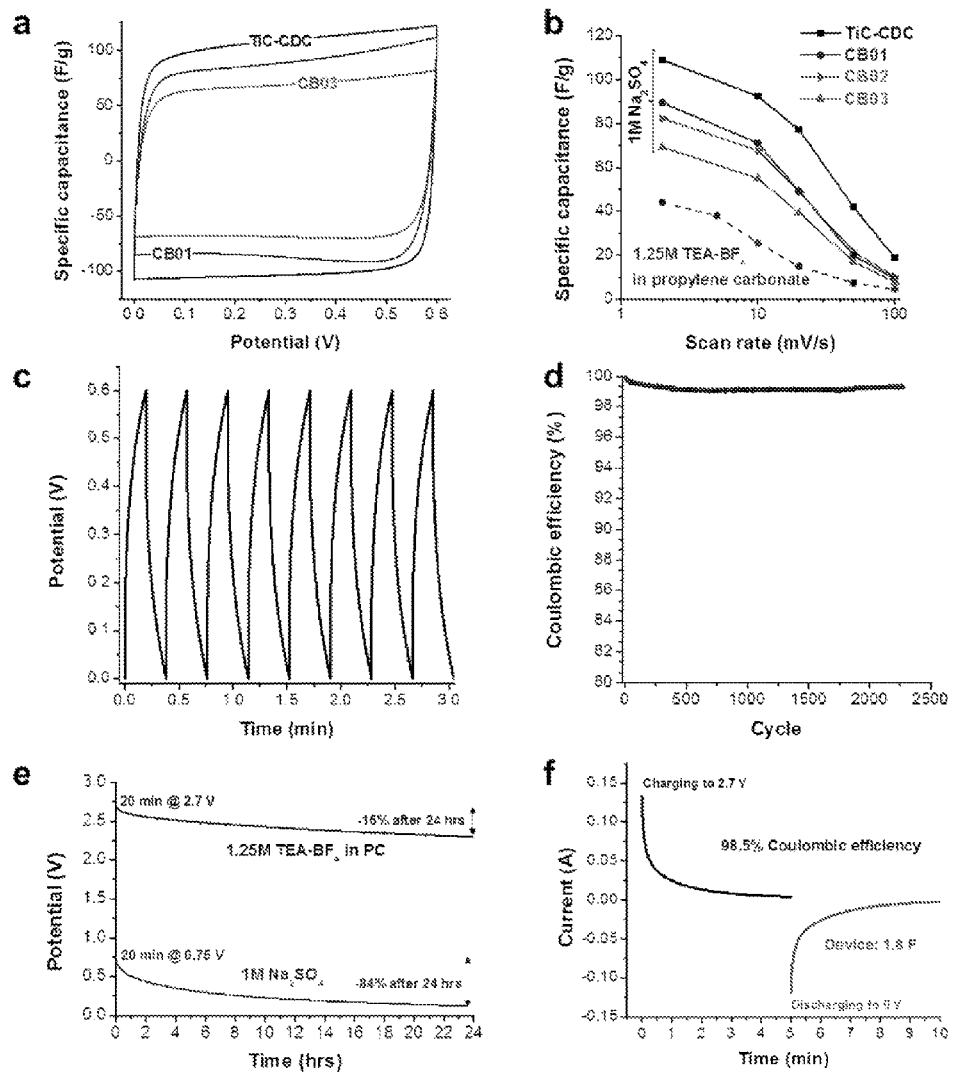
FIG. 14 illustrates several aspects of the electrochemical performance of aqueous and organic carbon slurries as described in Experimental Series 2, below. Carbon beads and TiC-CDC slurries (in 1M $Na_2SO_4$) charged to 0.6 V at 2 mV/s showed capacitive behavior as demonstrated by rectangular CVs (FIG. 14(a)). Dependency of the specific capacitance on the charge/discharge rate in aqueous and organic electrolytes (FIG. 14(b)). Galvanostatic charge/discharge (30 mA) of CB01 in 1M $Na_2SO_4$ shows an ohmic drop of 4.2 $\Omega cm^2$ with no electrochemical side-reactions (FIG. 14(c)), facilitating a high coulombic efficiency of approximately 99% over 2,250 charge and discharge cycles (FIG. 14(d)). Open circuit voltage of a 3:1 CB01 slurry after charging to 0.75 V in 1M $Na_2SO_4$ and to 2.7 V in 1.25M TEA-$BF_4$ in PC for 20 min, respectively, shows faster voltage loss over time for the aqueous than for the organic electrolyte (FIG. 14(e)). Chronoamperometry shows an equilibrium capacitance of 49 F/g for CB01 tested in organic electrolyte and a high coulombic efficiency of >98% when charged to a cell potential of 2.7 V and subsequently discharged to 0 V (FIG. 14(f)).
Figure 15:
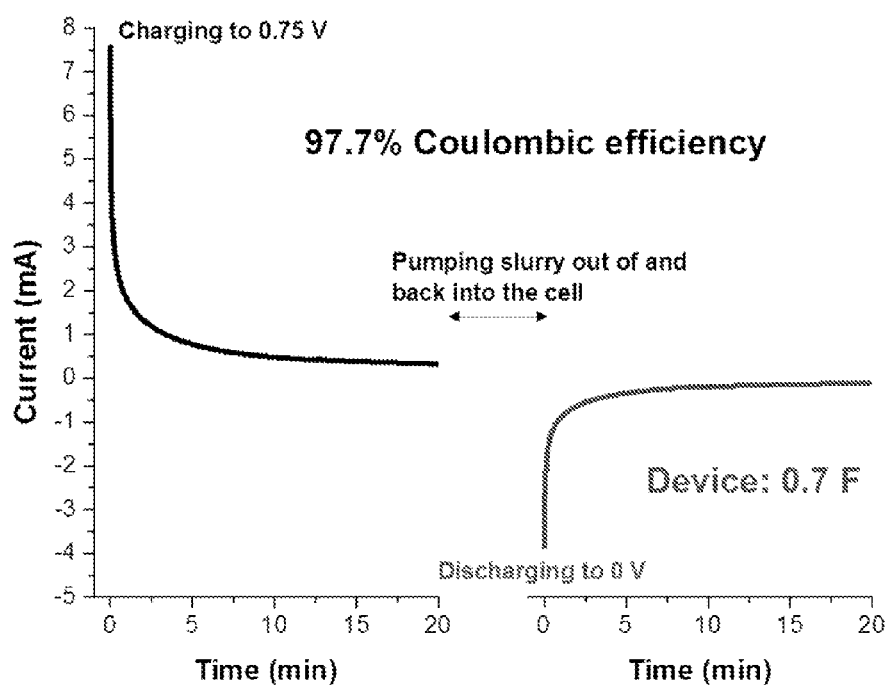
FIG. 15 illustrates the electrochemical performance in intermittent flow mode, as described in Experimental Series 2, below. After being charged at a potential of 0.75 V for 20 min, a carbon slurry based on a mixture of CB01 and 1M $Na_2SO_4$ is completely removed from the electrochemical cell and then pumped back into the cell to be discharged at 0 V for 20 min. When compensating for the leakage current, this translates into a coulombic efficiency of ~98% and a device capacitance of 0.7 F. The capacitance of this device was lower than the static cell because of the higher electrolyte:carbon ratio (4:1 instead of 3:1), which helped promote flowability.
Figure 16:
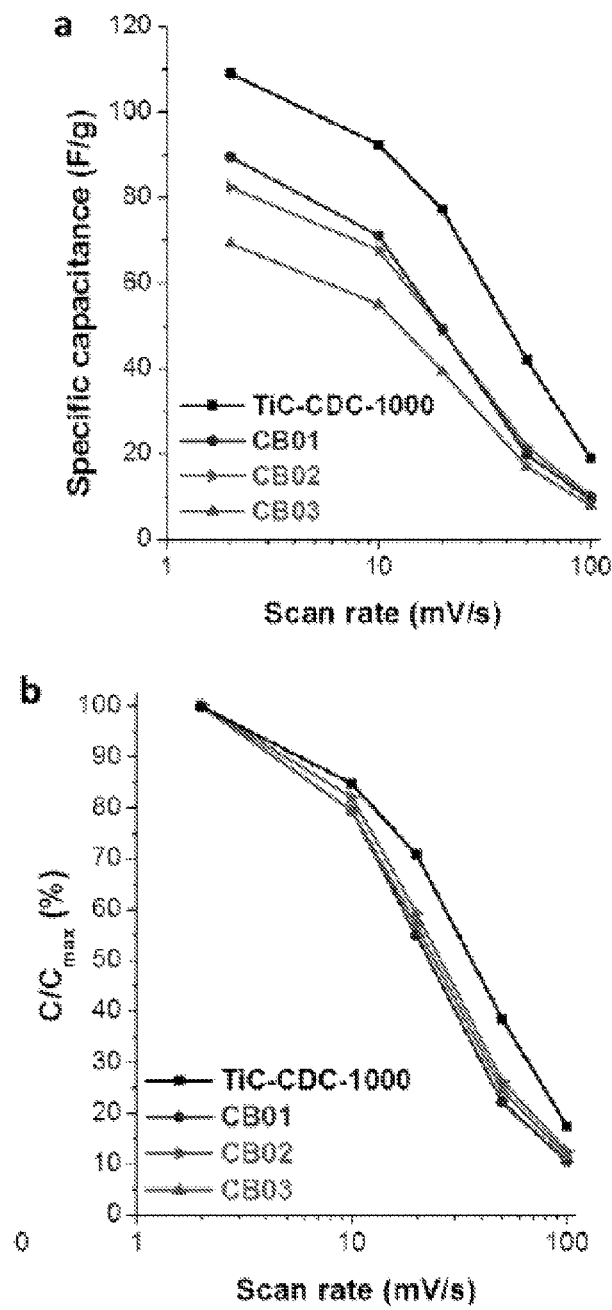
FIG. 16 shows data from Experimental Series 2, below.
Figure 17:
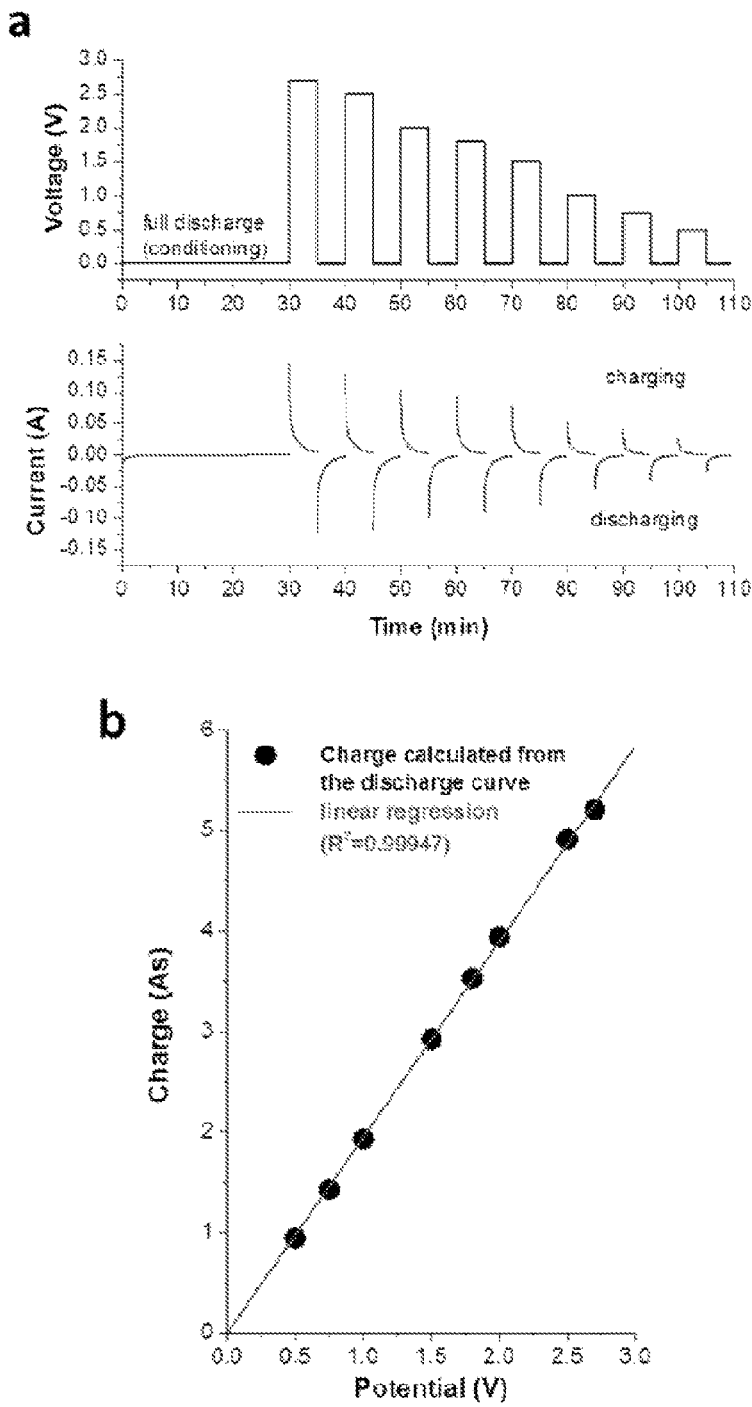

Slurries based on carbon beads (3:1 mixture) and CDC (6:1 mixture) were observed to behave pronouncedly capacitive when charged to 0.6 V in 1M Na$_2$SO$_4$ (aq) (FIG. 14(a)) and 2.7 V in 1.25M TEA-BF$_4$ in PC. The organic electrolyte exhibited a lower specific capacitance for CB01 (44 F/g at 2 mV/s) when compared to the performance of CB01 in aqueous electrolyte (95 F/g at 2 mV/s; FIG. 14(b)). TiC-CDC in aqueous electrolyte demonstrated the highest capacitance with 109 F/g at 2 mV/s, while the CB03 beads demonstrated the lowest capacitance (69 F/g) under the same conditions. The measured specific capacitance of the carbon slurries translates into an energy density of approximately 0.3 Wh/liter for the aqueous carbon slurries (e.g., comparable to the potential energy of water at 100 m height difference used for hydropower) and 3.7 Wh/liter of the PC-based carbon slurry, close to the values for commercial packed supercapacitor cells. Since the carbon weight accounts for about 30% of the total mass of the packaged commercial supercapacitors, a factor of 3-4 is frequently used to extrapolate the energy/power of the device from the performance of the material. However, this extrapolation is believed to be valid only for electrodes with the thickness and weight loading similar to that of commercial electrodes using 100-200 μm of carbon film on a current collector. For an electrochemical flow capacitor, for which the mass of the current collectors, separator, and other materials is small relative to the mass of the slurry, the total energy density is roughly equal to that of the slurry. Thus, even a non-optimized system shows very respectable energy density in these preliminary tests. Values of up to ca. 7 Wh/liter can be achieved for ionic liquid electrolytes with a 4 V stability window, yielding a projected capacitance of ca. 40 F/g.

All studied carbons showed a moderate equivalent series resistance (ESR) of ca. 4 Ωcm² when used in a toothpaste-like flowable 3:1 mass ratio of carbon in 1M Na$_2$SO$_4$. This value increased by a factor of 2.7 when increasing the channel depth of the flow cell from 0.8 to 1.6 mm. The rate-performance of the carbon slurries remained limited, with significant losses in the initial specific capacitance at scan rates faster than 10 mV/s (FIG. 14(b)). Nonetheless, even a low current density of 0.35 A/g enabled 8 full galvanostatic charge and discharge cycles within a 3 minute period (2.6 cycles per minute—one cycle every 23 seconds; FIG. 14(c)). The corresponding gravimetric capacitance from galvanostatic charge/discharge was observed to be similar to the values obtained from cyclic voltammetry (CB01: 102 F/g in aqueous and 45 F/g in organic electrolyte). Moreover, the galvanostatic cycling performance was found to be stable, with cycle efficiencies greater than 99% for the first 2250 charge/discharge cycles (FIG. 14(d)).

The time-dependent loss of the open circuit cell potential (self-discharge)—a common phenomenon in supercapacitors—was found to be higher for aqueous slurries than for organic carbon slurries (FIG. 14(e)). For 20 minutes of charging to maximum cell potential (0.75 V for aqueous and 2.7 V for organic electrolyte), the open circuit voltage dropped to 16% of the initial voltage (0.75 V) after 24 hrs for 1M Na$_2$SO$_4$ aqueous electrolyte, but remained at a high level of 2.3 V (=85%) for the organic electrolyte. The latter, while being a faster decay than observed in optimized commercial packed cells, was still in the range of values reported for supercapacitors. We note that charging for a longer period will further decrease the loss of potential over time, and the separate storage of the positively and negatively polarized slurries is expected to further decrease self-discharge by eliminating leakage current across the porous separator.

In terms of specific capacitance, both cyclic voltammetry and galvanostatic charge/discharge yielded a specific capacitance which was rate-dependent (i.e., depended on scan rate or current density). This was attributed to the dynamic effects associated with transport resistance inside micro- and mesopores and across the separator. As found by chronoamperometry (FIG. 14(f)), the intrinsic equilibrium capacitance of CB01 (aqueous: 125 F/g, organic: 49 F/g) was comparable, yet higher than the capacitance derived from rate-dependent methods (aqueous: +22%, organic: +9%). When compensating for the leakage current, the coulombic efficiency ($\varepsilon_c$) of the prototype was observed to be 98.5% which was in a very good agreement with the coulombic efficiency derived from galvanostatic charge/discharge (ca. 99%).

In order to evaluate the dynamic energy storage ability of the electrochemical flow capacitor, carbon slurry CB01 based on the aqueous electrolyte was tested in an intermittent-flow configuration. The main goal of this test was to verify that initially-charged carbon particles maintain their charge after hydraulic handling. The voltage efficiency ($\varepsilon_V$) was observed to reach 55.7%, while the coulombic efficiency was around 97.7%. The low voltage efficiency was attributed to the significant voltage drop during the time in which the slurry rests outside the electrochemical cell. One important distinction is that the self-discharge mechanism in the electrochemical flow capacitor is different than that in static supercapacitors; as such the potential drop in the electrochemical flow capacitor was not due to the significant loss of stored charge. Indeed, as seen from the high coulombic (i.e., current) efficiency, the potential drop is mainly caused by ion redistribution[15] during the time the slurry rests outside the electrochemical cell. It is observed that while the leakage current for our prototype cell can be up to 44% of the total charge, it can be significantly minimized through further optimization of the cell design.

As those skilled in the art will appreciate, numerous modifications and variations of the present invention are possible in light of these teachings, and all such are contemplated hereby. For example, in addition to the embodiments described herein, the present invention contemplates and claims those inventions resulting from the combination of features of the invention cited herein and those of the cited prior art references which complement the features of the present invention. Similarly, it will be appreciated that any described material, feature, or article may be used in combination with any other material, feature, or article, and such combinations are considered within the scope of this invention.

The disclosures of each patent, patent application, and publication cited or described in this document are hereby incorporated herein by reference, in their entirety.

What is claimed:

1. An energy storage device comprising
   (a) a positive electrode current collector, a negative electrode current collector, and an ion-permeable separator separating the positive and negative electrode current collectors;
   (b) a positive electrode disposed between the positive electrode current collector and the ion-permeable separator;
   (c) a negative electrode disposed between the negative electrode current collector and the ion-permeable separator;
   (d) wherein at least one of the positive and negative electrodes comprises a non-stationary solid or semi-solid composition comprising supercapacitive particles and an electrolytic solvent; and
   (e) wherein the electrolytic solvent is substantially free of electrochemically oxidizable or reducible species.

2. The energy storage device of claim 1 wherein both of the positive and negative electrodes independently comprise non-stationary solid or semi-solid compositions comprising supercapacitive particles and an electrolytic solvent.

3. The energy storage device of claim 1 wherein both electrolytic solvents are the same.

4. The energy storage device of claim 1 wherein the ion-permeable separator comprises a polyolefin, a fluorinated polymer, a sulfonated polymer, an alkoxylate polymer, a ceramic, or a copolymer or physical mixture or laminate thereof.

5. The energy storage device of claim 1 wherein the non-stationary solid or semi-solid composition is a flowing dispersion or slurry of supercapacitive and an electrolytic solvent.

6. The energy storage device of claim 1 wherein the non-stationary solid or semi-solid composition is a moving tape of supercapacitive particles and an electrolytic solvent.

7. The energy storage device of claim 1 wherein the electrolytic solvent is aqueous.

8. The energy storage device of claim 7 further comprising a soluble electrolyte comprising a halide, sulfate, or nitrate.

9. The energy storage device of claim 1 wherein the electrolytic solvent comprises a polar organic solvent.

10. The energy storage device of claim 9 wherein the polar organic solvent is acetonitrile, γ-butyl lactone, dimethylformamide, 1,2-dimethoxyethane, dimethyl carbonate, diethyl carbonate, dipropyl carbonate, ethylene carbonate, nitromethane, propylene carbonate, or sulfalone.

11. The energy storage device of claim 9 further comprising a soluble electrolyte comprising an anion-cation pair, wherein the cation comprises an alkali metal, an alkaline earth metal, a lanthanide, a tetraalkyl ammonium cation, aluminum or zinc and the anion comprises $OH^-$, $PF_6^-$, $ClO_4^-$, $BF_4^-$, $CF_3SO_3^-$, or $SbF_6^-$.

12. The energy storage device of claim 1 wherein the electrolytic solvent is an ionic liquid.

13. The energy storage device of claim 12 wherein the ionic liquid comprises cations of ethylmethylimmidazolium, tetraalkylammonium, dialkylimidazolium, trialkylimidazolium, tetraalkylimidazolium, alkylpyridinium, dialkylpyrrolidinium, dialkylpiperidinium, tetraalkylphosphonium, trialkylsulfonium, or any combination thereof.

14. The composition of claim 12, wherein the ionic liquid comprises an anion of $BF_4^-$, $B(CN)_4^-$, $n\text{-}C_3F_7BF_3^-$, $CH_3BF_3^-$, $CH_2CHBF_3^-$, $CF_3BF_3^-$, $C_2F_5BF_3^-$, $n\text{-}C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2N(CN)_2^-$, $C(CN)_3^-$, $SCN^-$, $SeCN^-$, $CuCl_2^-$, $AlCl_4^-$, or any combination thereof.

15. The energy storage device of claim 1 wherein the supercapacitive particles comprise carbon.

16. The energy storage device of claim 15 wherein the carbon is of the form of carbon black, carbide-derived carbon, or alliform carbon.

17. The energy storage device of claim 15 wherein the carbon is porous.

18. The energy storage device of claim 1, wherein the non-stationary solid or semi-solid composition comprises supercapacitive particles and electrolytic solvent in a weight ratio in the range of about 2:1 to about 5:1.

19. The energy storage device of claim 1, wherein the supercapacitive particles have mean particle diameters in the range of about 1 micron to about 500 microns.

20. The energy storage device of claim 1, wherein the positive current collector and the ion-permeable separator are separated by a first spacing distance and the negative current collector and the ion-permeable separator are separated by a second spacing distance, and the supercapacitive particles have a mean diameter, such that at least one of the first or second spacing distances is in the range of about 2 times to about 1000 times the mean diameter of the supercapacitive particles.

21. The energy storage device of claim 1 wherein the device is capable of achieving a coulombic cycle efficiency is at least about 95%.

22. A method of operating an energy storage device,
   (a) said energy storage device comprising
      (i) a positive electrode current collector, a negative electrode current collector, and an ion-permeable separator separating the positive and negative electrode current collectors;
      (ii) a positive electrode disposed between the positive electrode current collector and the ion-permeable separator and in electrical communication with the positive electrode current collector; the positive electrode current collector and the ion-permeable separator defining a positive capacitive zone accommodating the positive electrode;

(iii) a negative electrode disposed between the negative electrode current collector and the ion-permeable separator and in electrical communication with the negative electrode current collector; the negative electrode current collector and the ion-permeable separator defining a negative capacitive zone accommodating the negative electrode;

(iv) wherein at least one of the positive and negative electrodes comprises a non-stationary solid or semi-solid composition comprising supercapacitive particles and an electrolytic solvent; and (v) wherein the electrolytic solvent is substantially free of electrochemically oxidizable or reducible species; said method comprising:

(b) transporting at least one non-stationary solid or semi-solid composition into at least one capacitive zone during the operation of the device.

23. The method of claim 22, wherein at least one non-stationary solid or semi-solid composition comprises supercapacitive particles and electrolytic solvent in a weight ratio in the range of about 2:1 to about 5:1.

24. The method of claim 22, wherein the supercapacitive particles have mean particle diameters in the range of about 1 micron to about 500 microns.

25. The method of claim 22, wherein the positive current collector and the ion-permeable separator are separated by a first spacing distance and the negative current collector and the ion-permeable separator are separated by a second spacing distance, and the supercapacitive particles have a mean diameter, such that at least one of the first or second spacing distances is in the range of about 2 times to about 1000 times the mean diameter of the supercapacitive particles.

26. A method of storing energy using an energy storage device, (a) said energy storage device comprising
(i) a positive electrode current collector, a negative electrode current collector, and an ion-permeable separator separating the positive and negative electrode current collectors;

(ii) a positive electrode disposed between the positive electrode current collector and the ion-permeable separator and in electrical communication with the positive electrode current collector; the positive electrode current collector and the ion-permeable separator defining a positive capacitive zone accommodating the positive electrode;

(iii) a negative electrode disposed between the negative electrode current collector and the ion-permeable separator and in electrical communication with the negative electrode current collector; the negative electrode current collector and the ion-permeable separator defining a negative capacitive zone accommodating the negative electrode;

(iv) wherein at least one of the positive and negative electrodes comprises a non-stationary solid or semi-solid composition comprising supercapacitive particles and an electrolytic solvent; and (v) wherein the electrolytic solvent is substantially free of electrochemically oxidizable or reducible species; said method comprising:

(b) transporting a portion of an uncharged non-stationary solid or semi-solid composition comprising supercapacitive particles and a solvent comprising an electrolyte into at least one capacitive zone;

(c) applying an electric field is applied across the positive and negative electrode current collectors; and (d) exposing said portion of uncharged non-stationary solid or semi-solid composition to said electric field for a time sufficient to charge the supercapacitive particles, thereby producing a portion of charged non-stationary solid or semi-solid composition.

27. The method of claim 26 further comprising replenishing the capacitive zone with another portion of uncharged non-stationary solid or semi-solid composition comprising supercapacitive particles and a solvent comprising an electrolyte and repeating steps (c) and (d).

28. The method of claim 26 further comprising removing the charged supercapacitive particles from the capacitive zone and transporting them to an energy storage reservoir.

29. The method of claim 26, wherein at least one non-stationary solid or semi-solid composition comprises supercapacitive particles and electrolytic solvent in a weight ratio in the range of about 2:1 to about 5:1.

30. The method of claim 26, wherein the supercapacitive particles have mean particle diameters in the range of about 1 micron to about 500 microns.

31. The method of claim 26, wherein the positive current collector and the ion-permeable separator are separated by a first spacing distance and the negative current collector and the ion-permeable separator are separated by a second spacing distance, and the supercapacitive particles have a mean diameter, such that at least one of the first or second spacing distances is in the range of about 2 times to about 1000 times the mean diameter of the supercapacitive particles.

32. A method of releasing stored energy using a device:

(a) said device comprising
(i) a positive electrode current collector, a negative electrode current collector, and an ion-permeable separator separating the positive and negative electrode current collectors;

(ii) a positive electrode disposed between the positive electrode current collector and the ion-permeable separator and in electrical communication with the positive electrode current collector; the positive electrode current collector and the ion-permeable separator defining a positive capacitive zone accommodating the positive electrode;

(iii) a negative electrode disposed between the negative electrode current collector and the ion-permeable separator and in electrical communication with the negative electrode current collector: the negative electrode current collector and the ion-permeable separator defining a negative capacitive zone accommodating the negative electrode;

(iv) wherein at least one of the positive and negative electrodes comprises a non-stationary solid or semi-solid composition comprising supercapacitive particles and an electrolytic solvent; and (v) wherein the electrolytic solvent is substantially free of electrochemically oxidizable or reducible species; said method comprising:

(b) transporting a portion of an charged non-stationary solid or semi-solid composition comprising charged supercapacitive particles, such that the charged supercapacitive particles come into electrical communication with at least one adjacent current collector; and (c) discharging the charged supercapacitive particles through the adjacent current collector.

33. The method of claim 32 further comprising replenishing the capacitive zone with another portion of charged non-stationary solid or semi-solid composition comprising supercapacitive particles and repeating step (c).

34. The method of claim 32 further comprising removing the discharged supercapacitive particles from the capacitive zone and transporting them to a reservoir.

35. The method of claim 32, wherein at least one non-stationary solid or semi-solid composition comprises supercapacitive particles and electrolytic solvent in a weight ratio in the range of about 2:1 to about 5:1.

36. The method of claim 32, wherein the supercapacitive particles have mean particle diameters in the range of about 1 micron to about 500 microns.

37. The method of claim 32, wherein the positive current collector and the ion-permeable separator are separated by a first spacing distance and the negative current collector and the ion-permeable separator are separated by a second spacing distance, and the supercapacitive particles have a mean diameter, such that at least one of the first or second spacing distances is in the range of about 2 times to about 1000 times the mean diameter of the supercapacitive particles.

* * * * *